(12) United States Patent
Huth et al.

(10) Patent No.: US 10,787,275 B2
(45) Date of Patent: Sep. 29, 2020

(54) PROPELLER HEALTH MONITORING

(71) Applicant: Ratier-Figeac SAS, Figeac (FR)

(72) Inventors: Brian P. Huth, West Hartford, CT (US); Abdellah El Haloui, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 147 days.

(21) Appl. No.: 15/974,739

(22) Filed: May 9, 2018

(65) Prior Publication Data

US 2018/0327111 A1    Nov. 15, 2018

(30) Foreign Application Priority Data

May 10, 2017   (EP) .................................... 17305528

(51) Int. Cl.
| | | |
|---|---|---|
| *B64C 11/00* | (2006.01) | |
| *B64C 11/04* | (2006.01) | |
| *G01L 1/22* | (2006.01) | |
| *G01M 7/00* | (2006.01) | |
| *G01M 1/00* | (2006.01) | |

(Continued)

(52) U.S. Cl.
CPC .............. *B64D 45/00* (2013.01); *B64C 11/04* (2013.01); *G01L 1/22* (2013.01); *G01L 5/133* (2013.01);
(Continued)

(58) Field of Classification Search
CPC ..... B64C 11/00; B64C 11/003; B64C 11/005; B64C 11/008; B63H 23/00; G01L 1/00; G01L 1/02; G01L 1/04; G01L 1/06; G01L 1/16; G01L 1/08; G01L 1/205; G01M 1/00; G01M 1/02; G01M 1/12; G01M 1/14;
(Continued)

(56) References Cited

U.S. PATENT DOCUMENTS

| | | |
|---|---|---|
| 3,573,520 A | 4/1971 | Dorshimer |
| 4,373,862 A | 2/1983 | Ferris et al. |

(Continued)

FOREIGN PATENT DOCUMENTS

| | | |
|---|---|---|
| EP | 2354543 A1 | 8/2011 |
| GB | 2460044 A | 11/2009 |

OTHER PUBLICATIONS

European Search Report for Application No. 17305528.6-1557 dated Nov. 21, 2017, 9 pages.

(Continued)

*Primary Examiner* — Yonel Beaulieu
(74) *Attorney, Agent, or Firm* — Cantor Colburn LLP

(57) ABSTRACT

A method of monitoring the health of an aircraft propeller whilst the propeller is in operation, the propeller having a plurality of blades extending radially outwardly from a central axis extending through the propeller and a propeller drive shaft, is provided. The method includes obtaining measurements representative of strain in the propeller drive shaft using multiple primary strain sensors, each primary strain sensor providing respective measurements representative of strain. The primary strain sensors are located around a circumference of the drive shaft of the propeller, and each strain sensor is located such that it crosses a plane defined by the radial direction of a blade and the central axis, the plane being bounded by the central axis. A corresponding propeller health monitoring system, an aircraft propeller comprising the system and an aircraft comprising the propeller are also provided.

20 Claims, 21 Drawing Sheets

US 10,787,275 B2
Page 2

(51) Int. Cl.
- *B63H 3/00* (2006.01)
- *B64C 11/30* (2006.01)
- *B64D 45/00* (2006.01)
- *G01M 5/00* (2006.01)
- *G01L 5/13* (2006.01)
- *G01M 1/28* (2006.01)
- *G07C 5/00* (2006.01)
- *G07C 5/08* (2006.01)

(52) U.S. Cl.
CPC ............ *G01M 1/28* (2013.01); *G01M 5/0016* (2013.01); *G01M 5/0033* (2013.01); *G01M 5/0041* (2013.01); *G01M 5/0083* (2013.01); *G07C 5/006* (2013.01); *G07C 5/0808* (2013.01); *G07C 5/0816* (2013.01); *B64D 2045/0085* (2013.01)

(58) Field of Classification Search
CPC .... G01M 1/122; G01M 1/127; G08C 5/0808; G08C 5/0816
See application file for complete search history.

(56) References Cited

U.S. PATENT DOCUMENTS

| | | | |
|---|---|---|---|
| 6,974,362 B2 * | 12/2005 | Lindell | B24B 23/02 451/24 |
| 7,131,339 B2 | 11/2006 | Kwun | |
| 7,458,277 B2 | 12/2008 | Discenzo et al. | |
| 8,240,990 B2 | 8/2012 | Kammer et al. | |
| 8,757,003 B1 | 6/2014 | Makaremi | |
| 8,909,453 B2 | 12/2014 | Wendelsdorf et al. | |
| 9,240,083 B2 | 1/2016 | Isom et al. | |
| 9,944,404 B1 | 4/2018 | Gentry | |
| 2004/0082283 A1 * | 4/2004 | Lindell | B24B 23/02 451/343 |
| 2015/0168352 A1 | 6/2015 | Sohn | |
| 2015/0247778 A1 | 9/2015 | Haschke et al. | |
| 2016/0178464 A1 | 6/2016 | Burns et al. | |
| 2016/0304192 A1 | 10/2016 | Hale et al. | |
| 2016/0336748 A1 * | 11/2016 | Andrieu | H02J 3/02 |
| 2017/0323496 A1 | 11/2017 | Baker | |
| 2018/0327112 A1 | 11/2018 | Huth et al. | |
| 2019/0168868 A1 * | 6/2019 | Buesing | B64C 27/605 |
| 2019/0263514 A1 * | 8/2019 | Schmiedel | B64C 27/04 |

OTHER PUBLICATIONS

P.M. Pawar, et al. "Helicopeter rotor health monitoring—a review", J. Aerospace Engineering, vol. 221, No. 5, May 1, 2007 (May 1, 2007), pp. 631-647.

Spoltman, M W et al. "Fatigue Testing of a Composite Propeller Blade Using Fiber-Optic Strain Sensors" IEEE Sensors Journal, vol. 3, No. 4, Aug. 2003. 7 pages (pp. 393-399).

* cited by examiner

PROPELLER HEALTH MONITORING

FOREIGN PRIORITY

This application claims priority to European Patent Application No. 17305528.6 filed May 10, 2017, the entire contents of which is incorporated herein by reference.

TECHNICAL FIELD

This disclosure relates to the technical area of health monitoring of propellers for providing a warning or an indication that maintenance is required. In particular, the field of the disclosure lies in the area of aircraft engine propellers.

BACKGROUND OF THE DISCLOSURE

It is known in the art to monitor the health of propeller blades on an aircraft to assess if maintenance work needs to be carried out. This prevents unnecessary maintenance checks being undertaken and also provides early warnings of damage.

U.S. Pat. No. 9,240,083 B2 discloses a general method of monitoring a rotor for faults. The loads on a rotor shaft are measured to obtain a measured signal. A residual is calculated between this measured signal and a virtual estimated signal. The residual is subsequently compared with a categorical model, and an output representative of a rotor fault is obtained.

The present disclosure aims to provide improved methods and apparatuses for propeller health monitoring.

SUMMARY OF THE DISCLOSURE

In a first aspect, the disclosure provides a method of monitoring the health of an aircraft propeller whilst the propeller is in operation, the propeller having a plurality of blades extending radially outwardly from a central axis extending through the propeller and a propeller drive shaft, the method comprising: obtaining measurements representative of the strain in the propeller drive shaft using multiple primary strain sensors, each primary strain sensor providing respective measurements representative of strain; wherein the primary strain sensors are located around a circumference of the drive shaft of the propeller; and wherein each strain sensor is located such that it crosses a plane defined by the radial direction of a blade and the central axis, the plane being bounded by the central axis.

It will be appreciated that the primary strain sensor can therefore be understood as corresponding to the blade at which it is located by crossing a plane defined by the radial direction of the blade and the central axis, the plane being bounded by the central axis. Conversely, the blade may be considered as corresponding to the primary strain sensor which is located such that it crosses a plane defined by the radial direction of the blade and the central axis, the plane being bounded by the central axis.

Strain sensors may also be known as strain gauges.

Obtaining measurements representative of strain may comprise obtaining voltage values from strain sensors that are representative of strain, for example from a full, half or quarter-bridge strain gauge comprising foil sensors. The measurements representative of strain may comprise voltage values.

The step of obtaining measurements representative of strain may comprise measuring the strain. The measurements representative of strain may comprise strain measurements.

The measurements representative of strain may be obtained over time, e.g. the measurements may be made continuously or periodically over a period of time. Multiple strain measurements over a period of time enable bending moment values to be determined over a period of time, and thus the steady (i.e. average) bending moment to be determined.

In embodiments, the method may further comprise obtaining measurements representative of strain in the propeller drive shaft using multiple secondary strain sensors, each secondary strain sensor being located around the circumference of the drive shaft diametrically opposite to a respective primary strain sensor and forming a sensor pair therewith.

In embodiments, the method may further comprise: determining a respective steady bending moment of the drive shaft corresponding to each primary strain sensor using the respective measurements representative of strain obtained by each primary strain sensor or using the respective measurements representative of strain obtained by each strain sensor pair.

The step of determining a respective steady bending moment of the drive shaft may comprise converting each measurement representative of strain into a bending moment value. This may be done by calculating the bending moment from the measurements representative of strain. A calibration may be made between measurements representative of strain and bending moment in order to find a constant value to convert strain to bending moment, without the need for a full bending moment calculation.

The step of determining a respective steady bending moment of the drive shaft may include utilising a first algorithm to calculate the time taken for one revolution of the propeller, given by $(RPM/60)^{-1}$. Then, a second algorithm may be utilised to record the maximum and minimum bending moment determined utilising the measurements representative of strain from each primary sensor (or sensor pair) in each revolution. A third algorithm may be used to calculate the steady bending moment (SBM) corresponding to each strain sensor in each revolution by taking the average of the recorded maximum and minimum bending moments, i.e. (max+min)/2. It will be appreciated that in order to determine the steady bending moment in this way, the measurements representative of strain should be obtained over a period of time.

The magnitude of the calculated steady bending moments may be compared to a threshold. Furthermore, the method may comprise establishing that the health of the propeller may be impaired if the magnitude of a calculated steady bending moment of the drive shaft is above a threshold. It may also include indicating an alert for maintenance if it is established that the health of the propeller may be impaired.

The magnitude of the calculated steady bending moments may be compared to one another. Furthermore, the method may comprise establishing that the health of the propeller may be impaired if the magnitude of one of the steady bending moments of the drive shaft is outside of a tolerance of the other steady bending moments of the drive shaft. It may also include indicating an alert for maintenance if it is established that the health of the propeller may be impaired.

In embodiments, the method may further comprise for a propeller having an odd number of blades, identifying a damaged blade by: identifying the blade corresponding to the primary sensor or sensor pair which provided the measurements representative of strain which has led to a steady bending moment being calculated which has a magnitude above the threshold and/or which is outside of the tolerance of the other steady bending moments of the drive shaft. An alert for maintenance of the identified blade may be indicated.

In embodiments, the method may further comprise, for a propeller having an even number of blades, identifying which two diametrically opposed blades may include at least one damaged blade, by: identifying the blades corresponding to the primary sensor or sensor pair which provided the measurements representative of strain which has led to a steady bending moment being calculated which has a magnitude above the threshold and/or which is outside of the tolerance of the other steady bending moments of the drive shaft. An alert for maintenance of the identified blades may be indicated.

By a blade "corresponding to" the primary sensor or sensor pair will be understood as meaning the blade having the primary strain sensor located such that it crosses a plane defined by the radial direction of the said blade and the central axis, the plane being bounded by the central axis.

In embodiments, the strain sensors are full bridge strain gauges.

The disclosure further provides a system configured to perform a method for monitoring aircraft propeller health according to any of the embodiments described above.

The disclosure further provides a propeller health monitoring system comprising: a plurality of primary strain sensors or pairs of primary and secondary strain sensors, the primary strain sensors or strain sensor pairs being configured to provide measurements representative of strain in a drive shaft of a propeller; and a processor configured to carry out the determining, comparing and establishing steps as described in any of the above embodiments. Moreover, the disclosure provides an aircraft propeller comprising such a propeller health monitoring system, wherein: the propeller has a plurality of blades extending radially outwardly from hub arms of a propeller hub, which in turn extend radially outwardly from a central axis extending through the propeller and a propeller drive shaft; the primary strain sensors or pairs of primary and secondary strain sensors are arranged around a circumference of the drive shaft of the propeller; each primary strain sensor is located such that it crosses a plane defined by the radial direction of a blade and the central axis, the plane being bounded by the central axis; and in the case in which strain sensor pairs are provided, each secondary strain sensor in the strain sensor pair is located around the circumference of the drive shaft diametrically opposite to its corresponding primary strain sensor. The processor may be integrated into a FADEC of the aircraft or in the nacelle and the strain sensors are configured to transmit the measured strain to the processor via telemetry, Wi-Fi, or a slip ring.

Also provided is an aircraft comprising such an aircraft propeller.

In various embodiments as described, it is established that the health of the propeller may be impaired, e.g. that damage may have occurred. "May be" is used since the methods provide an indication, and not necessarily 100% certainty that the health is impaired. However, in embodiments, it may be said that the methods include establishing that the health of the propeller is impaired.

It will be readily appreciated by the skilled person that the various optional and preferred features of embodiments of the disclosure described above may be applicable to all the various aspects and embodiments of the disclosure.

BRIEF DESCRIPTION OF THE FIGURES

Preferred embodiments of the present disclosure will now be described by way of example only and with reference to the accompanying drawings, in which.

DETAILED DESCRIPTION

Figure 1:
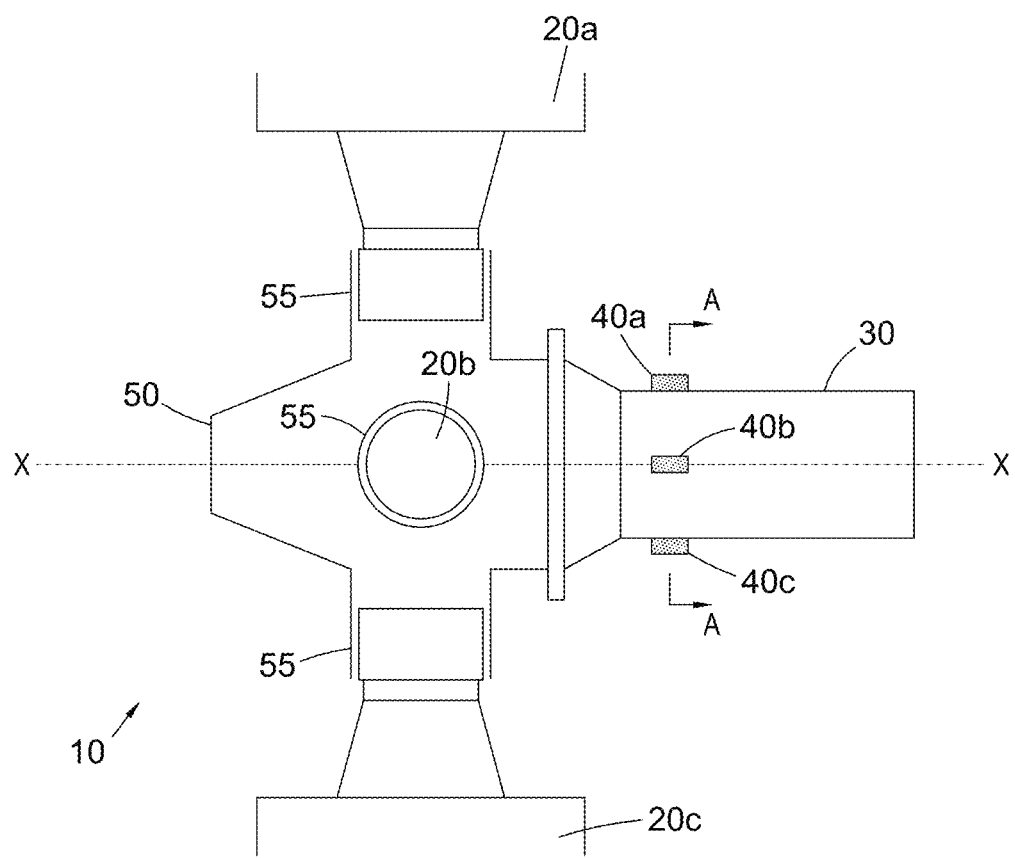
FIG. 1 shows schematically a first embodiment of a first propeller health monitoring arrangement for a propeller having four blades.

The term "a first propeller health monitoring arrangement" is used herein to describe an arrangement in which strain sensors are located on the drive shaft of the propeller. First, second, third and fourth embodiments of such an arrangement are discussed below.

The term "a second propeller health monitoring arrangement" is used herein to describe an arrangement in which strain sensors are located on the hub arms of the propeller. First and second embodiments of such an arrangement are discussed below.

The terms "shaft method one", "shaft method two", "shaft method three" and "shaft method four" are used herein to describe four respective methods for monitoring propeller health utilising strain sensors mounted on the shaft of the propeller.

The term "hub method" is used herein to describe a method for monitoring propeller health utilising strain sensors mounted on hub arms of the propeller.

The term "propeller health monitoring" is a well known term in the art describing the monitoring of propellers to establish (i.e. detect or determine) whether damage has (or may have) occurred to propellers, in particular aircraft propellers, and in particular aircraft propeller blades. In other words, to establish whether the health of the propeller may be, or is, impaired.

The inventors have recognised that all identical healthy blades on a single propeller produce the same thrust as the propeller rotates and have the same centrifugal force. As the propeller is rotated by the propeller drive shaft, since a centreline of the propeller is inclined at an angle relative to the direction of flight (or the opposite direction defined by the free stream velocity vector), the drive shaft experiences a bending moment comprising a sum of sinusoidal bending moments, i.e. a constant rotating bending moment. By way of explanation, every circumferential point on the shaft is exposed to the same sinusoidal variation in strain, thus there are an infinite number of sinusoids. If the bending moment associated with each blade is considered (e.g. as determined from strain measurements measured by sensors aligned with the blades), there are N bending moment sinusoids, which are phase shifted by $2\pi/N$ where N is the number of blades on the propeller.

The sinusoidal bending moments are cyclic bending moments which fluctuate above and below a steady bending moment by equal amounts, i.e. they are centred around a steady bending moment. A steady bending moment of the drive shaft is the average bending moment experienced by the drive shaft as it rotates about its axis. For a healthy, perfectly balanced propeller, there is no steady bending on the shaft, i.e. the steady bending moment is zero, and there is only an axial load (thrust).

The inventors have realised that these sinusoidal bending moments can be measured by fixing (i.e. mounting, attaching) strain sensors corresponding to the blades around the shaft at positions on the circumference of the shaft which are aligned with the circumferential positions at which the blades are located. Put another way, for a propeller having a plurality of blades extending radially outwardly from hub arms of a propeller hub, which in turn extend radially outwardly from a central axis extending through the propeller and a propeller drive shaft, strain sensors corresponding to each of the blades can be provided around a circumference of the drive shaft, each crossing a plane defined by the radial direction of the corresponding blade and the central axis, the plane being bounded by the central axis.

Thus, it will be appreciated that in embodiments of the first propeller health monitoring arrangement of the disclosure, where a sensor "corresponding" to a blade or "aligned with" a blade is referred to, it is intended to mean a sensor that is provided on the circumference of the drive shaft crossing a plane defined by the radial direction of said blade and the central axis of the drive shaft, the plane being bounded by the central axis.

The sensors measure strain in the drive shaft, preferably continuously over time. The bending moments can be determined from the strain measurements made by the strain sensors, as will be discussed later. Thus, whilst the strain sensors measure strain, the strain sensor output is directly related to bending moment. Consequently, in this disclosure, the strain sensors are sometimes referred to as monitoring or measuring bending moment. Further, it can be understood that a sensor has a corresponding bending moment, i.e. a bending moment determined from the strain measured by that sensor. A sensor will also have a corresponding steady bending moment calculated from measuring bending moment over time.

The inventors have also realised that when a propeller blade has been damaged, it may produce more or less thrust than a healthy propeller blade and may also experience a different centrifugal force compared to a healthy blade. Consequently, the damaged blade will give rise to a sinusoidal bending moment centred around a non-zero steady bending moment.

The damaged blade will also absorb more or less power than the healthy opposing blade. This torque imbalance results in a steady shear force in the propeller plane of rotation. The steady shear force results in a second steady bending moment on the propeller shaft that is 90° away from (i.e. 90° out of phase with) the steady bending moment produced by the thrust imbalance. However, the magnitude of the moment produced by the in-plane shear force, as determined from strain measurements measured by the sensors on the shaft, is very small compared to the moment produced by the thrust imbalance. There are two main reasons for the relatively small responses; one is that the magnitude of the shear force is typically small. The second is that the distance between the sensors and the application point of the shear force (i.e. the propeller plane of rotation) is also small. These two factors combine to produce a small bending moment at the sensors, which is generally not seen during flight tests. Therefore, this second bending moment contribution is not considered in the present disclosure. For a propeller having four blades (and a sensor aligned with each blade), only the sensor corresponding to the damaged blade or the sensor diametrically opposite the damaged blade will monitor a change in steady bending moment (i.e. by virtue of measuring strain from which bending moment is determined). In other words, if a sensor monitors a change in steady bending moment, then either the blade aligned therewith or the blade diametrically opposed thereto is damaged. The sensor(s) corresponding to the healthy blade(s) will continue to monitor a zero steady bending moment since they are on the neutral axis. The neutral axis is, by definition, the location on a structural member where the stress and strain produced by a bending moment is zero. For a circular shaft with a uniform cross-section, the neutral axis passes through the centre of the shaft and is aligned with the bending moment vector.

For a propeller having an even number of blades greater than four, or an odd number of blades, if there is a damaged blade(s) all of the sensors will monitor a deviation in steady bending moment from zero, even those corresponding to healthy blades. However, in the case of an odd number of blades, the largest deviation will be monitored by the sensor corresponding to the damaged blade. In the case of an even number of blades greater than four, the largest deviation will be monitored by the sensor corresponding to or diametrically opposite to the damaged blade.

Additionally, the sinusoidal bending moment for a damaged blade may have a different amplitude compared to that of a healthy (i.e. undamaged) blade of the propeller.

Thus, by identifying a shift in steady bending moment away from a zero steady bending moment and the magnitude of the shift, e.g. by comparing with a threshold, it is possible to both establish if the health of the propeller is impaired, and also identify which blade(s) are damaged. Damage detectable by identifying such a shift in bending moment may include airfoil damage or oil in a blade cavity, which would create an aerodynamic or mass imbalance.

FIG. 1 shows a first embodiment of a first arrangement, in which a propeller 10 is attached to a propeller drive shaft 30. The propeller 10 has blades 20a, 20b, 20c and 20d (blade 20d is not shown) which are spaced equidistantly around the circumference of the propeller 10, and extend radially outwardly from hub arms 55 of a propeller hub 50. These hub arms 55, in turn, extend radially outwardly from a central axis, X, which extends through the propeller and propeller drive shaft.

Arranged around the drive shaft 30 are strain sensors 40a, 40b, 40c and 40d (sensor 40d is not shown). Each sensor is aligned circumferentially with one of the blades, such that the sensors 40a, 40b, 40c and 40d are aligned respectively with blades 20a, 20b, 20c and 20d. Each strain sensor crosses a plane defined by the radial direction of the corresponding blade and the central axis, the plane being bounded by the central axis. The strain sensors measure strain (e.g. elongation or compression), and exemplary suitable strains sensors are discussed later. However, it will be appreciated by the skilled person that the type of measurements provided by the strain sensors may depend on the type of strain sensor used. Typically, a strain sensor may provide a voltage output that is representative of the strain. Therefore, where "strain measurements" are discussed in relation to the present disclosure, this is intended to encompass such measurements that are representative of the strain, e.g. measurements that are a function of strain. Moreover, where "measuring the strain" is discussed in relation to the present disclosure, this is intended to encompass obtaining measurements that are representative of strain.

This arrangement is exemplary only and other embodiments may have other numbers of blades. There may be an even number of blades or odd numbers of blades; but in either case, at least some of the blades will each have a sensor aligned therewith. It is preferred the each blade is provided with a corresponding sensor in order to provide the most accurate result, however in some embodiments sensors may only be provided for some blades.

Figure 2:
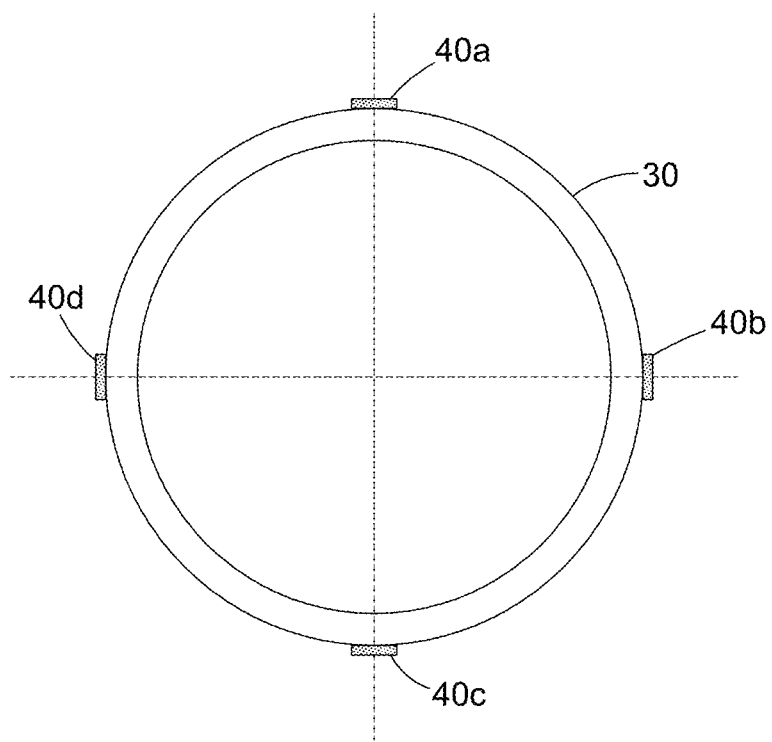
FIG. 2 shows a cross section of the drive shaft of FIG. 1, taken along the line A-A, the drive shaft having four sensors mounted thereto.

The cross section shown in FIG. 2 is taken along the line A-A in FIG. 1 and shows sensors 40a, 40b, 40c and 40d as described above and as shown in FIG. 1. As described above, each of the sensors 40a-d is aligned with a respective one of the blades 20a-d.

In use, the drive shaft 30 of the propeller will rotate in the usual way, thereby rotating sensors 40a, 40b, 40c and 40d with blades 20a, 20b, 20c and 20d. The sensors measure the strain (in this case provide a voltage that is representative of the strain, see discussion above) in the shaft at each location. Strain is measured continuously or periodically over time, preferably over multiple revolutions of the propeller. This also applies to the later described embodiments.

The bending moment is determined from the measured strain (in this case from the voltage representative of the strain). It may be calculated using methods readily understood by those skilled in the art. Or, to simplify matters, a calibration can be made between strain and bending moment, by finding a relationship between a known applied moment and the measured strain. The response is typically very linear, so it is a simple constant to convert strain sensor output to bending moment. In embodiments, this constant is input to the Data Acquisition System (DAS) computer together with the strain measurements so that the DAS computer can easily convert strain measurements to bending moment and provide a bending moment output (i.e. in engineering units).

In either case, it will be appreciated that in embodiments of the first propeller health monitoring arrangement, the strain is measured by the strain sensors and the strain sensor measurements are converted to bending moments by a processor, in an appropriate way.

In the present embodiment, this measured strain is input to a processor (not shown) for calculation of bending moment. The processor may be located in the FADEC or in the nacelle, in which cases the measured strains may for example be transmitted via a slip, ring telemetry and/or Wi-Fi from the rotating part to the static part and then to the FADEC or nacelle. This allows for real-time processing of the measured strains. If it is desirable to instead analyse data after a flight, it may also be possible to record and store data and download this at the end of the flight.

The combination of the sensors and the processor may together be considered as an apparatus or system.

The processor calculates the shaft bending moments from the measured strain values for each of the sensors 40a, 40b, 40c and 40d which correspond to the bending moments in the plane of each respective blade 20a, 20b, 20c and 20d. The bending moments calculated for each sensor location are then analysed to determine if the blade associated with that sensor may be damaged, as is discussed further below. Since strain measurements are obtained over a period of time (and thus how the strain changes over time is known), bending moment over a period of time can be determined from these strain measurements, thus it is known how bending moment changes over time. This enables steady bending moment to be determined as discussed later. This also applies to later described embodiments of the first propeller health monitoring arrangement.

It should be noted that in this context, a bending moment of a shaft is a bending moment of the shaft in the frame of reference of the shaft, i.e. with respect to the shaft, so the frame of reference is taken as rotating with the propeller drive shaft. This is not the same as a dynamic bending moment measured using a stationary object as the reference point and viewing the rotating propeller drive shaft as having a relatively rotating bending moment.

Figure 3:
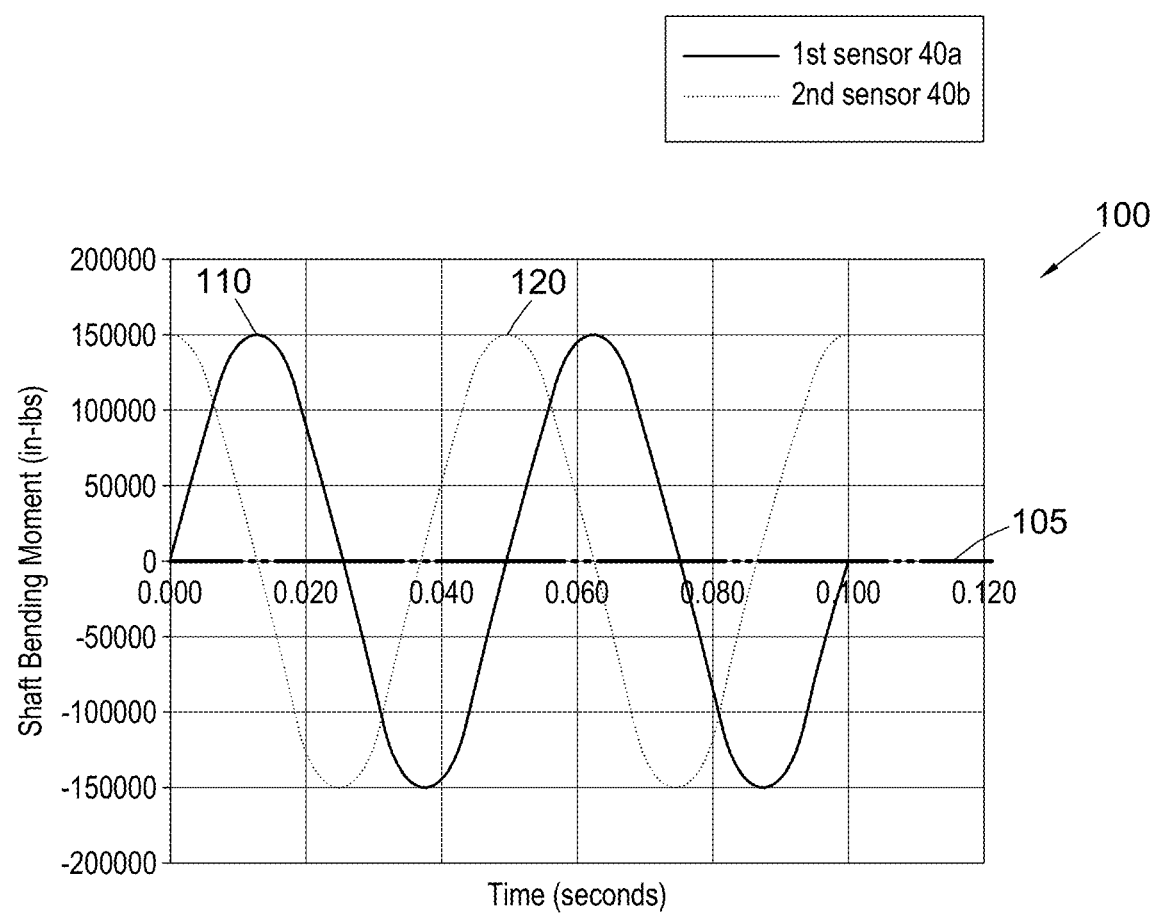
FIG. 3 is a graph illustrating the shaft bending moments measured by two of the sensors using the arrangement of FIGS. 1 and 2 for a propeller in which the blades corresponding to the sensors are healthy (i.e. undamaged)

FIG. 3 illustrates graphically the shaft bending moments over time, for the propeller 10 of FIG. 1, calculated using strain data from two of the sensors: 40a and 40b. The skilled person would readily appreciate how to calculate bending moment from measured strain data. In this case, the blades 20a, 20b of the propeller 10 which correspond to these sensor measurements are healthy.

The solid line 110 shows the bending moment of the drive shaft 30 over time in a first plane defined as a plane having a normal being a vector product of:
- the diameter of the drive shaft 30 at the orientation at which the first sensor 40a, is connected thereto; and
- the axis of rotation of the drive shaft 30.

In other words, the solid line 110 represents the bending moment calculated from the first sensor.

The first plane rotates with the drive shaft, since the first sensor 40a rotates with the drive shaft.

The dotted line 120 shows the bending moment of the drive shaft 30 over time in a second plane defined as a plane having a normal being a vector product of:
- the diameter of the drive shaft 30 at the orientation at which the second sensor 40b is connected thereto; and
- the axis of rotation of the drive shaft 30.

In other words, the dotted line 120 represents the bending moment calculated from the second sensor.

The second sensor 40b is located at an orientation which is 90 degrees rotated about the axis of the drive shaft relative to the first sensor. The second plane rotates with the drive shaft 30, since the second sensor 40b rotates with the drive shaft.

Both of the bending moments 110, 120 are sinusoids centred around a zero steady bending moment, shown by the dashed line 105. In other words, although the drive shaft may at times during rotation bend in one direction in the respective plane and at other times during rotation bend in the opposite direction in the respective plane, the average bending moment is zero. This means that the thrust produced by the blades 20a, 20b and the centrifugal force generated by the blades 20a, 20b are equal, and indicates that each of blades 20a, 20b are (or are very likely to be) healthy, i.e. undamaged. Moreover, the blade diametrically opposite to each of blades 20a, 20b is also likely to be healthy.

Figure 4:
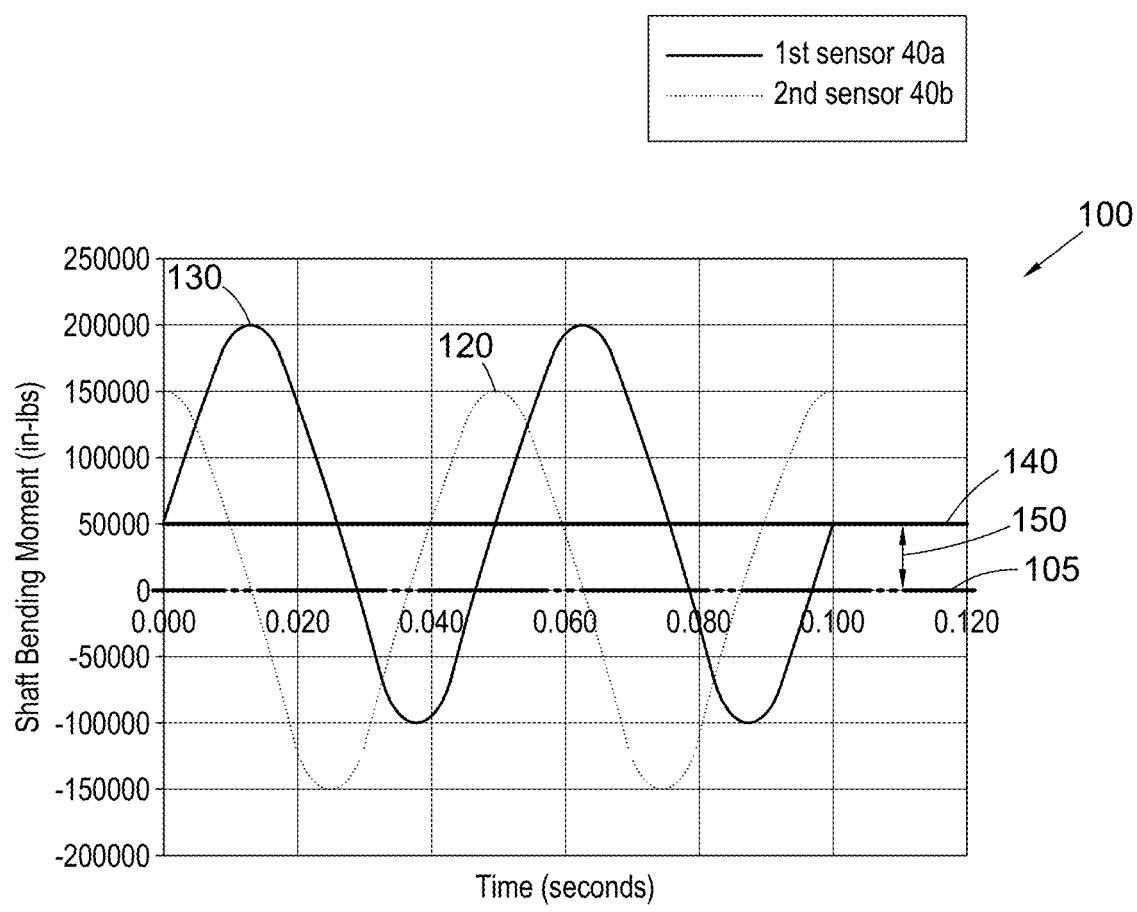
FIG. 4 is a graph illustrating the shaft bending moments measured by two of the sensors using the arrangement of FIGS. 1 and 2, for a propeller in which a blade and the blade diametrically opposite thereto are healthy (undamaged) and at least one is damaged.

Conversely, FIG. 4 illustrates graphically the shaft bending moments over time, for the propeller 10 of FIG. 1, in the case that blade 20a and/or the blade diametrically opposite to it, blade 20c, is damaged. As shown in FIG. 4, although the dotted line 120 (representing the bending moment calculated using measurements by the second sensor 40b) has not changed compared to FIG. 3 and is still centred about the zero steady bending moment indicated by dashed line 105, the solid line 110 (representing the bending moment calculated from the first sensor 40a) has shifted to be centred about a non-zero steady bending moment, and is now labelled as line 130.

So, the bending moment has an average bending moment which is offset from zero bending moment. In other words, as the propeller drive shaft 30 rotates, it tends to bend more in one direction than it does in the opposite direction. The non-zero average bending moment, i.e. the steady bending moment, is given by solid line 140 and the amount by which it is offset from a zero average bending moment is indicated by arrow 150.

In this case, at least one of the blade 20a corresponding to the first sensor 40a and the blade 20c located diametrically opposite across the propeller from the first sensor 40a, has been damaged. (As mentioned earlier, in propellers with an even number of blades such that each blade has a blade diametrically opposite thereof, a sensor aligned with a particular blade will monitor a deviation in steady bending moment if either that blade or its diametrically opposite counterpart is damaged).

Since this embodiment is for a four-bladed propeller, for all healthy blades which are not diametrically opposed across the propeller from a damaged blade, the measured steady bending moment will remain at zero. Thus the steady bending moment 105 for the cyclic bending moment given by dotted line 120 (which corresponds to the measurement from the second sensor 40b located 90 degrees around the propeller from the first sensor 40a) does not deviate from zero in this case as the corresponding blade 20b (and the diametrically opposite blade 20d) is (are) not damaged.

The four bladed propeller is unique because the sensor (e.g. 40b) aligned with one undamaged blade (e.g. 20b) and the sensor (e.g. 40d) aligned with its opposing undamaged counterpart (e.g. 20d) are on the neutral axis for a moment caused by damage to either (or both) of the other two blades (40a, 40c). Hence, the steady bending moment determined from measurements by sensors aligned with the undamaged blades does not deviate from zero. If, on the other hand, there are more blades with sensors, they will not be on the neutral axis and will respond to damage to the other blades. Thus, in other propeller embodiments where there are an even number of blades greater than four, or an odd numbers of blades, as mentioned above even healthy blades will have a steady bending moment deviated from zero. But, the magnitude of the deviation will be less than the deviation for damaged blades.

It is the magnitude of the deviation from the zero bending moment for each sensor which is determined by the processor in order to establish if a blade (or, for propellers with even numbers of blades, the blade diametrically opposed to it) is damaged, and thus whether the health of the propeller is impaired.

Depending on what damage has occurred, there may be a positive or negative steady bending moment, i.e. a positive or negative offset 150 from zero, although the latter is not shown in FIG. 4. The quantity to be evaluated is therefore the magnitude of the offset 150. If the magnitude of the offset 150 exceeds a predetermined threshold, it is established that either the blade corresponding to the sensor yielding the offset steady bending moment 150 exceeding the threshold, or the blade diametrically opposed from that blade, is damaged. Consequently, an alert for maintenance can be triggered and the identified blades of the propeller can be inspected for damage and repair or replacement work can be carried out. If the magnitude of the steady bending moment offset is below the predetermined threshold, it is established that the offset is not significant enough to be indicative of a damaged blade.

The threshold for the magnitude of the offset is specific to the particular propeller and may depend on various factors such as number of blades, total thrust and blade diameter, all of which can affect the observed steady bending moments. For example, from a thrust-standpoint, even brand new blades which are intended to be identical may not be perfectly balanced (i.e. they may have inherent small thrust differences), due to manufacturing tolerances. Furthermore, there may be a bias in the observed steady bending moments due to a drift on the strain sensors because of temperature compensation. In order that such effects are not accidentally confused with steady bending moment offsets due to blade damage, it should be established empirically what is the extent of any offset present when the blades are healthy. A suitable offset threshold for blade damage can then be chosen which would clearly indicate a blade being damaged.

The skilled person would readily understand that an appropriate threshold can be established empirically from test data, e.g. data obtained during a flight test. This is well within the capability of the skilled person.

The above described method utilises a comparison with a threshold of the offset between a zero bending moment and the average bending moment, in order to detect a damaged blade (this is described in more detail later as the "shaft method one", with reference to FIG. 7).

However, in another method (described in more detail later as the "shaft method two", with reference to FIG. 8), the average, i.e. steady, bending moment corresponding to each sensor may be compared with that of the other sensors in order to detect the presence of a damaged blade. This could be achieved for example by calculating the cumulative "error" in the steady bending moments measured by each strain gauge as given by the following formula:

$$\text{error } SBM_n = \left[ \sum_{i=1}^{N} (SBM_n - SBM_i)^2 \right]^{0.5}$$

where n is the reference number for the strain sensor in question and N is the total number of strain sensors.

From this, it can be established that the blade corresponding to the strain sensor which gives rise to the largest "error" in the steady bending moment (or, for even numbers of blades, the blade diametrically opposite) may be damaged.

Figure 5:
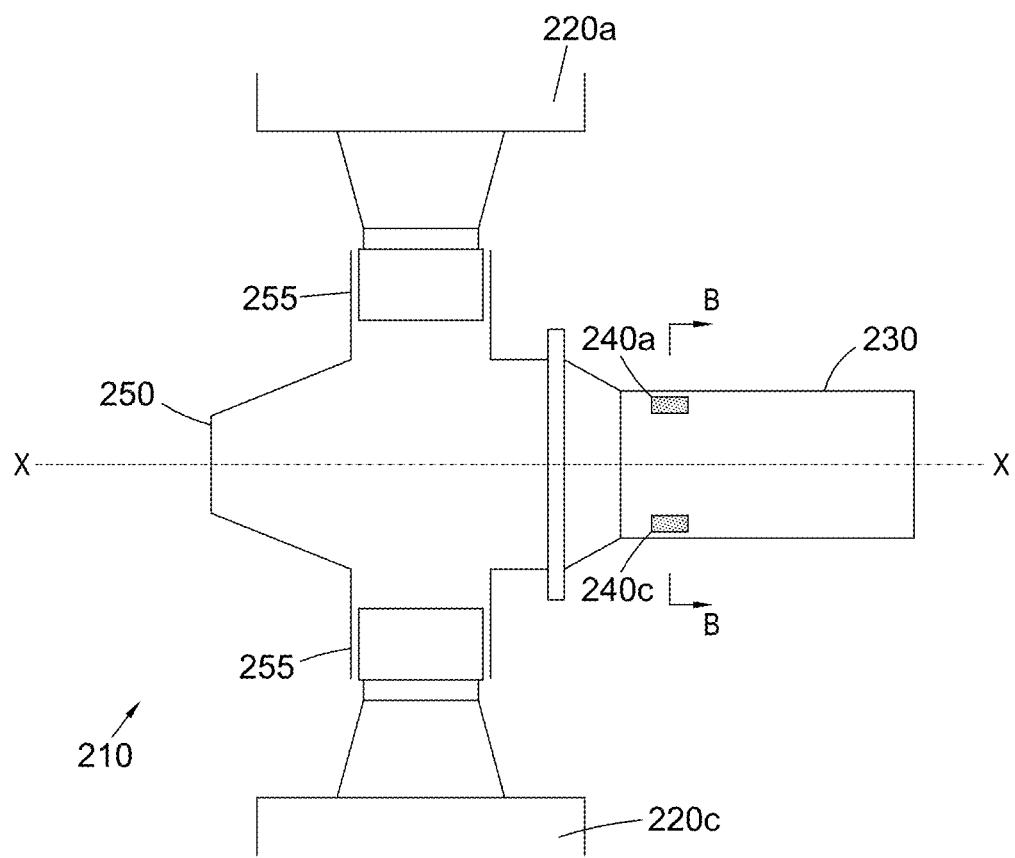
FIG. 5 shows schematically a second embodiment of a first propeller health monitoring arrangement for a propeller having three blades.

A second embodiment of the first propeller monitoring arrangement, in which a propeller has an odd number of blades, is now described. FIG. 5 shows a propeller 210 having three blades 220a, 220b (not shown) and 220c. The blades 220a, 220b, 220c are connected to the hub 250 of the propeller via hub arms 255. Attached to the propeller is a drive shaft 230 having three sensors 240a, 240b, 240c, the arrangement of which can be seen more clearly in FIG. 6.

Figure 6:
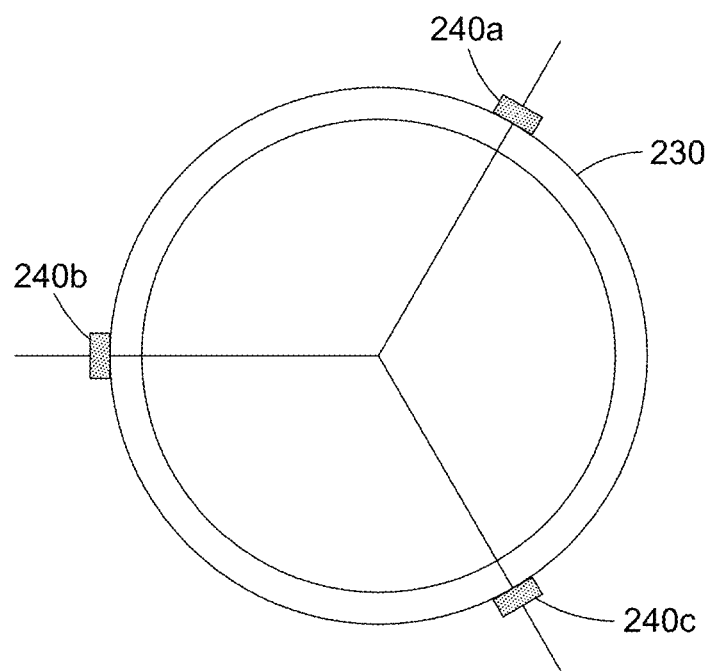
FIG. 6 shows a cross section of the drive shaft of FIG. 5, taken along the line B-B, the drive shaft having three sensors mounted thereto.

FIG. 6 shows a cross section through the drive shaft along the line B-B in FIG. 5. The circumferential locations of each of the blades 220a, 220b and 220c are indicated by radial lines. There are three sensors: sensor 240a is aligned with blade 220a; sensor 240b is aligned with blade 220b; and sensor 240c is aligned with blade 220c.

The bending moments determined from strain measurements measured by the strain sensors 240a, 240b, 240c when plotted graphically would resemble those shown in FIG. 3 for a healthy propeller having an even number of blades. That is, the sinusoidal bending moments would be centred around an average bending moment of zero, i.e. have a zero steady bending moment. However, if a single blade were to become damaged, the steady bending moments for all of the blades would be offset from zero, while the offset of the steady bending moment determined from the strain measurement measured by the sensor corresponding to the damaged blade would have the greatest magnitude.

The two methods (shaft method one and shaft method two) for monitoring the health of a four-bladed propeller, as described above, can also be used with this second embodiment of the disclosure.

In the first method (shaft method one), the magnitude of the steady bending moments can be compared against a threshold. Since the magnitude of the offset steady bending moment corresponding to the damaged blade will be the largest, the threshold can be selected, for example in the manner described above, such that only significantly large offsets will exceed the threshold. Thus the damaged blade can be identified. Alternatively, the amount by which the steady bending moments exceed the threshold can be calculated. The greatest amount is indicative of which blade is damaged.

In the second method (shaft method two), the steady bending moment corresponding to sensor may be compared with that of the other sensors in order to detect the presence of a damaged blade. This could be achieved for example by calculating the cumulative "error" in the steady bending moments determined from the strain measured by each sensor as given by the following formula:

$$\text{error } SBM_n = \left[ \sum_{i=1}^{N} (SBM_n - SBM_i)^2 \right]^{0.5}$$

where n is the reference number for the strain sensor in question and N is the total number of strain sensors.

From this, it can be established that the strain sensor which gives rise to the largest "error" in the steady bending moment has a corresponding blade which may be damaged.

Figure 7:
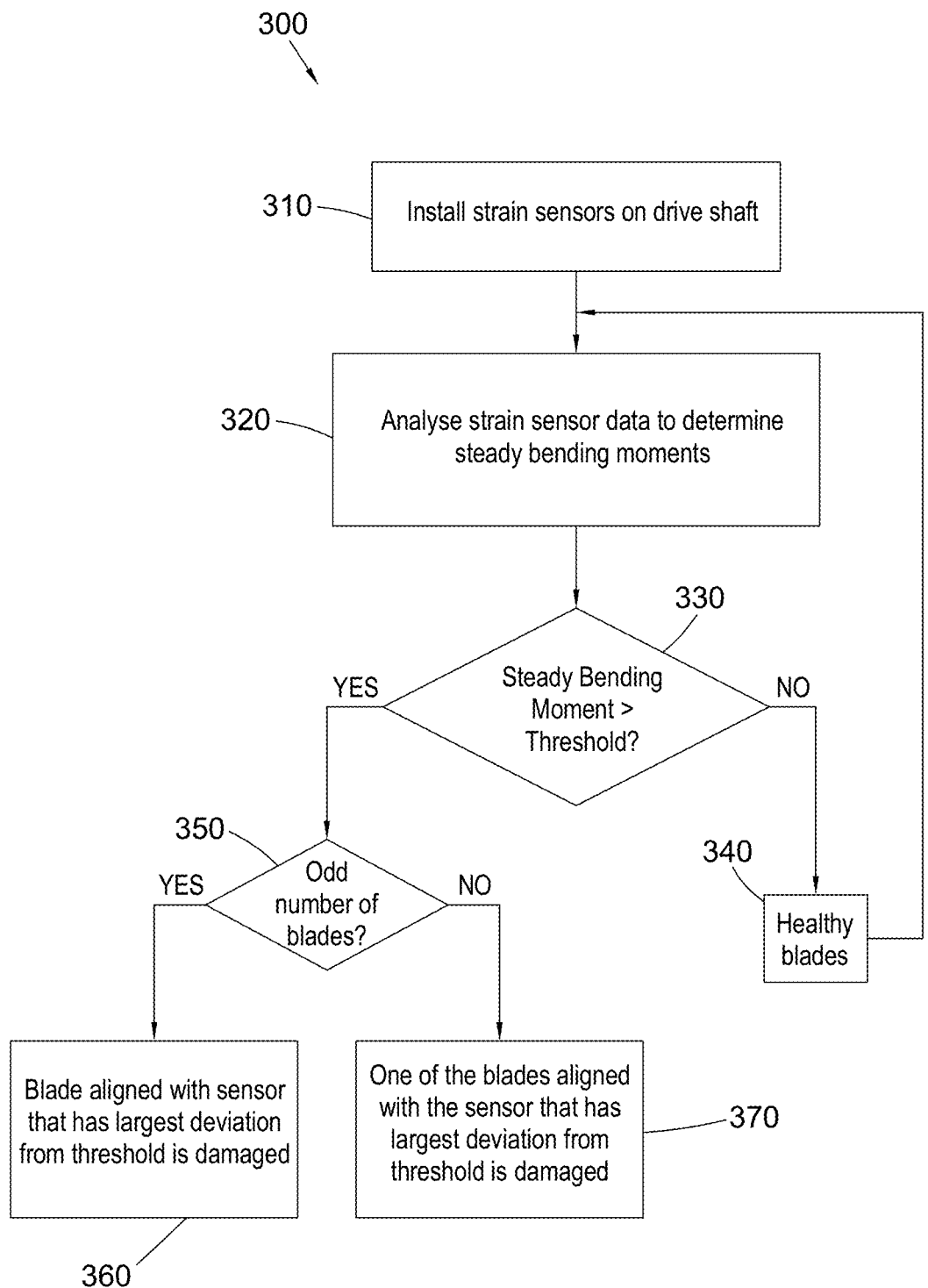
FIG. 7 shows a flow diagram of a method for monitoring propeller health using the arrangements of FIGS. 1, 2, 5 and 6, herein called "shaft method one"

FIG. 7 describes in more detail the "shaft method one" 300 for a propeller with an even or an odd number of blades. At step 310, strain sensors are installed on the drive shaft of the propeller, one corresponding to each blade. Each sensor provides a measurement of the strain in the drive shaft at that location.

At step 320, the strain sensor data is analysed to determine the steady bending moment corresponding to each sensor. This includes using a processor to convert the strain measurements to bending moments and perform various algorithms to find the steady bending moment. A first algorithm calculates the time taken for one revolution of the propeller, given by $(RPM/60)^{-1}$. A second algorithm records the maximum and minimum bending moment measured by each sensor in each revolution. A third algorithm calculates the steady bending moment (SBM) for each sensor in each revolution by taking the average of the recorded maximum and minimum bending moments, i.e. (max+min)/2.

At step 330, the magnitudes of the calculated steady bending moments (SBM) corresponding to each sensor are compared to a threshold. A decision is taken as to whether the steady bending moment magnitudes exceed the threshold. If none of them exceed the threshold, then at step 340, the blades are deemed healthy and the method returns to step 320. Otherwise, if one or more steady bending moment magnitude does exceed the threshold, then the method proceeds with step 350.

At step 350, the method determines if the propeller has an odd number of blades. If this is the case, then it is established at step 360 that the blade aligned with the sensor, the strain measurement of which yielded the largest steady bending moment exceeding the threshold, is damaged. Otherwise, if there is an even number of blades, then it is established at step 370 that the blade aligned with the sensor and/or the blade diametrically opposite to the sensor, the strain measurement of which yielded the largest steady bending moment exceeding the threshold, is damaged.

An alert (e.g. a visual or aural indicator) can then be raised and the identified blade or pair of blades can then be inspected for maintenance.

Figure 8:
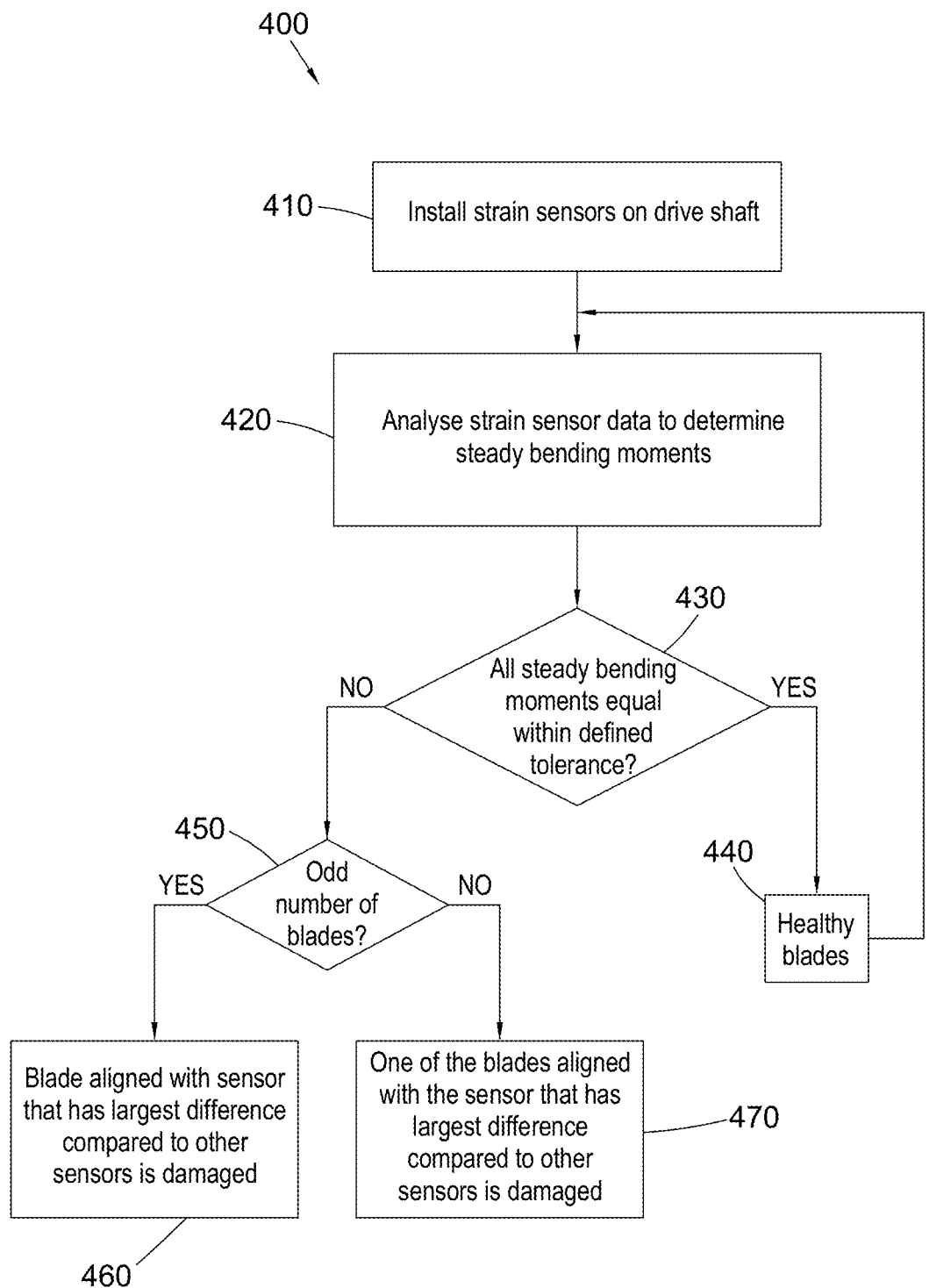
FIG. 8 shows a flow diagram of another method for monitoring propeller health using the arrangements of FIGS. 1, 2, 5 and 6, herein called "shaft method two"

FIG. 8 describes in more detail the "shaft method two" 400 for a propeller with an even or an odd number of blades. At step 410, a strain sensor (e.g. a full bridge strain gauge) is installed on the drive shaft of the propeller corresponding to each blade. Each sensor measures the strain in the drive shaft at that location.

At step 420, the strain sensor data is analysed to determine the steady bending moment corresponding to each sensor. This includes using a processor to convert the strain measurements to bending moments and perform various algorithms. A first algorithm calculates the time taken for one revolution of the propeller, given by $(RPM/60)^{-1}$. A second algorithm records the maximum and minimum bending moment measured by each sensor in each revolution. A third algorithm calculates the steady bending moment (SBM) for each sensor in each revolution by taking the average of the recorded maximum and minimum bending moments, i.e. (max+min)/2.

At step 430, the magnitudes of the calculated steady bending moments (SBM) corresponding to each sensor are compared to each other. For example, the cumulative "error" may be calculated in the steady bending moments corresponding to each strain sensor as given by the following formula:

$$\text{error } SBM_n = \left[ \sum_{i=1}^{N} (SBM_n - SBM_i)^2 \right]^{0.5}$$

where n is the reference number for the strain sensor in question and N is the total number of strain sensors. From this, it can be established that the strain sensor which gives rise to the largest "error" in the steady bending moment (i.e. an error outside a defined tolerance) has a corresponding blade (or blades) which may be damaged. A decision is then taken as to whether the steady bending moments are equal within a defined tolerance. Thus if all of the "error"s calculated above are within a defined tolerance, such as for example, a 3%, 5%, 10%, 15% or 20% tolerance, the blades are deemed at step 440 to be healthy and the method returns to step 420. Otherwise, if any of the "error"s calculated above are not within a defined tolerance, such as for example, a 3%, 5%, 10%, 15% or 20% tolerance, then the method proceeds with step 450.

At step 450, the method determines if the propeller has an odd number of blades. If this is the case, then it is established at step 460 that the blade aligned with the sensor, the strain measurement of which has yielded the largest "error" compared to the "error" of the other sensors, or which has yielded the largest difference in steady bending moment compared to the steady bending moments of the other sensors, is damaged. Otherwise, if there is an even number of blades, then it is established at step 470 that the blade aligned with the sensor and/or the blade diametrically opposite to the sensor, the strain measurement of which has yielded the largest "error" compared to the "error" of the other sensors, or which has yielded the largest difference in steady bending moment compared to the steady bending moments of the other sensors, is damaged.

An alert (e.g. a visual or aural indicator) can then be raised and the identified blade or pair of blades can then be inspected for maintenance.

In the first and second embodiments of the first propeller health monitoring arrangement described above, a sensor is provided for each of at least some of the blades of the propeller. Strain in the propeller drive shaft is measured using these multiple sensors (which may be denoted "primary sensors"), with each sensor providing a respective strain measurement. These "primary sensors" are located around a circumference of the drive shaft, and each primary sensor is located such that it crosses a plane defined by the radial direction of a blade and the central axis, the plane being bounded by the central axis. Thus, the strain measured by each strain sensor is associated with a particular blade or blade pair comprising the particular blade and a diametrically opposed blade.

However, the present inventors have discovered that advantages are offered by using pairs of strain sensors, with a pair of strain sensors being associated with a particular blade or blade pair. Each pair of strain sensors can comprise a "primary sensor", and a "secondary sensor", wherein the secondary sensor is located around the circumference of the drive shaft diametrically opposite to a primary sensor. The terminology "primary" and "secondary" is merely used to distinguish between the sensors, and does not infer that one is preferable in any way to the other. In embodiments utilising such a pair of strain sensors, the method of the disclosure additionally comprises measuring strain in the propeller drive shaft using the secondary sensors, and the steady bending moment associated with each blade is calculated using the strain data obtained by both sensors of each pair. This offers the advantage that axial load can be cancelled out. Embodiments utilising pairs of strain sensors are now described.

Sinusoidal bending moments can be measured by fixing strain sensors in pairs corresponding to the blades around the shaft, each sensor pair comprising a sensor at a position on the circumference of the shaft which is aligned with the circumferential position at which a blade is located (denoted a primary sensor) and a sensor at a position diametrically opposite from it across the shaft (denoted a secondary sensor), on the circumference of the shaft. Put another way, for a propeller having a plurality of blades extending radially outwardly from hub arms of a propeller hub, which in turn extend radially outwardly from a central axis extending through the propeller and a propeller drive shaft, diametrically opposed strain sensor pairs corresponding to each of the blades can be provided around a circumference of the drive shaft, each strain sensor pair comprising two sensors crossing a plane defined by the radial direction of the corresponding blade and the central axis and being diametrically opposed to one another across the drive shaft.

For a propeller having an odd number of blades N, there will be N sensor pairs, while for a propeller having an even number of blades N, there will be N/2 sensor pairs, since each pair of diametrically opposed blades shares a sensor pair. It will be appreciated that for an even number of blades, if a particular blade Y has a primary sensor aligned therewith and a secondary sensor diametrically opposite, that secondary sensor is also aligned with a blade, call this blade Z. The secondary sensor for blade Y is then the primary sensor for blade Z, whilst the primary sensor for blade Z is the secondary sensor for blade Y. In practice, therefore, each pair of diametrically opposed blades shares a sensor pair and shares the sensor measurements made by the pair. Thus, the strain measurements for blade Y will be the same as the strain measurements for blade Z.

When a propeller blade has been damaged, as discussed previously, it may produce more or less thrust than a healthy propeller blade and may also experience a different centrifugal force compared to a healthy blade. Consequently, the damaged blade will give rise to a sinusoidal bending moment centred around a non-zero steady bending moment.

For a propeller having four blades (and thus two sensor pairs), one blade (or two opposing blades) of which are damaged, only the sensor pair corresponding to the damaged blade(s) will monitor a change in steady bending moment. The sensor pair corresponding to the healthy blades will continue to monitor a zero steady bending moment since they are on the neutral axis. As mentioned above, the neutral axis is, by definition, the location on a structural member where the stress and strain produced by a bending moment is zero. For a circular shaft with a uniform cross-section, the neutral axis passes through the centre of the shaft and is aligned with the bending moment vector.

For a propeller having an even number of blades greater than four, or an odd number of blades, if there is a damaged blade(s) all of the sensor pairs will monitor a deviation in steady bending moment from zero, even those corresponding to healthy blades. However, the largest deviation will be monitored by the sensor pair corresponding to the damaged blade.

Additionally, the sinusoidal bending moment for a damaged blade or blades may have a different amplitude compared to that of a healthy (i.e. undamaged) blade or blades of the propeller.

Thus, by identifying a shift in steady bending moment away from a zero steady bending moment and the magnitude of the shift, e.g. by comparing with a threshold, it is possible to both establish if the health of the propeller is impaired, and also identify which blade(s) are damaged. Damage detectable by identifying such a shift in bending moment may include airfoil damage or oil in a blade cavity, which would create an aerodynamic or mass imbalance.

Figure 9:
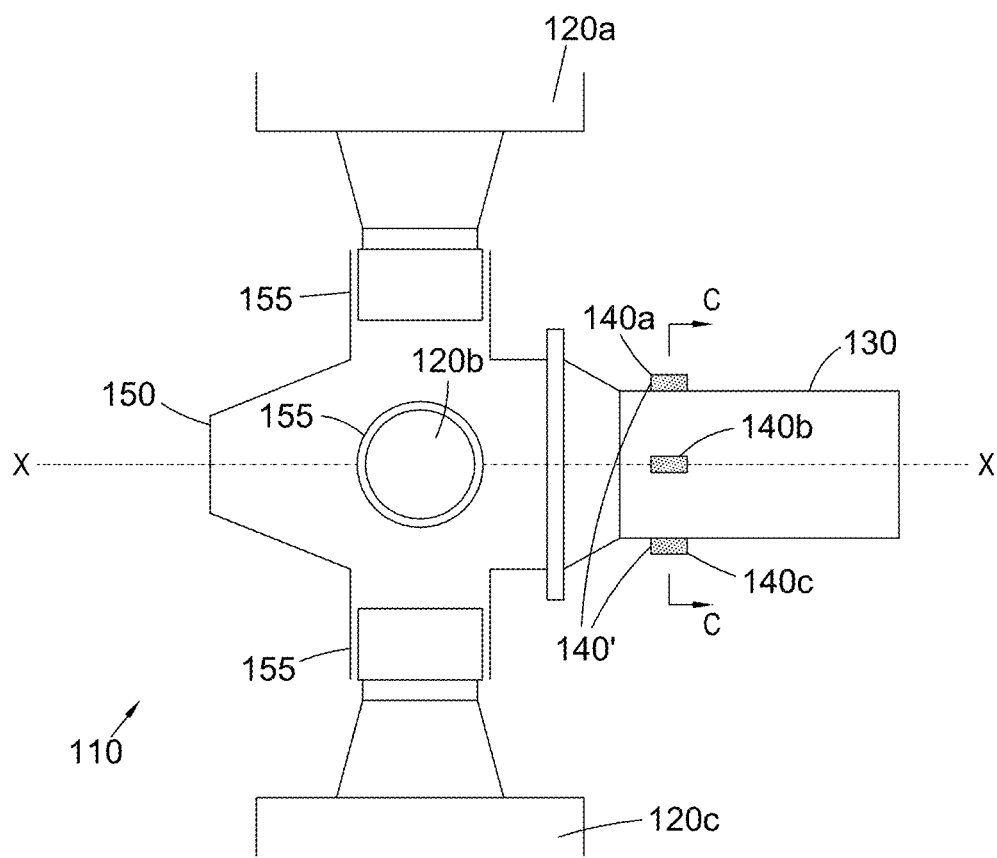
FIG. 9 shows schematically a third embodiment of first propeller health monitoring arrangement for a propeller having four blades.

FIG. 9 shows a third embodiment of a first arrangement, in which a propeller 110 is attached to a propeller drive shaft 130. The propeller 110 has four blades 120*a*, 120*b*, 120*c* and 120*d* (blade 120*d* is not shown) which are spaced equidistantly around the circumference of the propeller 110, and extend radially outwardly from hub arms 155 of a propeller hub 150. These hub arms 155, in turn, extend radially outwardly from a central axis X, which extends through the propeller 110 and propeller drive shaft 130.

Arranged around the drive shaft 130 are strain sensors 140*a*, 140*b*, 140*c*, 140*d* (sensor 140*d* is not shown), each corresponding to one of the blades 120*a*, 120*b*, 120*c* and 120*d* respectively.

Sensors 140*a* and 140*c* form primary and secondary sensors respectively of a sensor pair 140', with the secondary sensor 140*c* being arranged diametrically opposite across the drive shaft 130 from the primary sensor 140*a*. Sensors 140*b* and 140*d* form primary and secondary sensors respectively of another sensor pair 140", with the secondary sensor 140*d* being arranged diametrically opposite across the drive shaft 130 from the primary sensor 140*b*. Each blade is thus provided with a sensor pair: blades 120*a* and 120*c* are provided with sensor pair 140', whilst blades 120*b* and 120*d* are provided with sensor pair 140".

The primary strain sensor of each pair 140', 140", crosses a plane defined by the radial direction of the blade for which the sensor pair is provided and the central axis, the plane being bounded by the central axis.

As described previously, since there are an even number of blades equidistantly spaced around the circumference of the propeller, the primary sensor of a sensor pair corresponding to one blade also acts as a secondary sensor of a sensor pair corresponding to the diametrically opposed blade. Thus for a propeller having an even number of blades N, there are N sensors, such that two diametrically opposed blades share a sensor pair. In other words, opposing blades "share" the same sensors. Each strain sensor in each strain sensor pair crosses a plane defined by the radial direction of the corresponding blade and the central axis.

Exemplary suitable strain sensors are discussed later. The two strain sensors in each pair will generally be wired together such that twice the strain output is provided for a given shaft bending moment, thus yielding greater accuracy.

Figure 10:
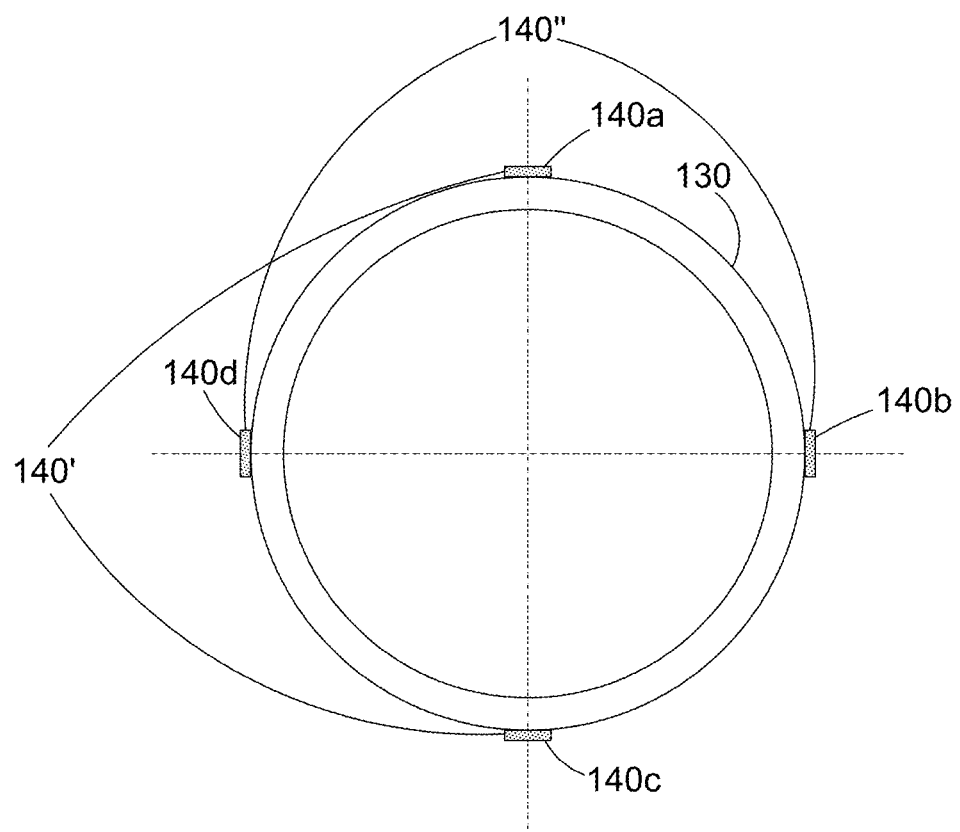
FIG. 10 shows a cross section of the drive shaft of FIG. 9, taken along the line C-C, the drive shaft having four sensors, arranged in pairs of diametrically opposed sensors, mounted thereto.

The arrangement of FIGS. 9 and 10 is exemplary only and other embodiments may have other numbers of blades. There may be an even number of blades or odd numbers of blades, the latter being described below in relation to FIG. 13. In either case, there will be a strain sensor pair, or "bending pair" provided for each of at least some of the blades, with one sensor of the pair being aligned with the blade and another sensor being arranged diametrically opposite.

The cross section shown in FIG. 10 is taken along the line C-C in FIG. 9 and shows sensors 140*a*, 140*b*, 140*c* and 140*d* as described above and as shown in FIG. 9. As described above, each of the sensor pairs 140' (140*a* and 140*c*), 140" (140*b* and 140*d*) is aligned with two of the blades 120*a*, 120*c*, 120*b*, 120*d*, such that two diametrically opposed blades share a sensor pair.

In use, the drive shaft 130 of the propeller will rotate in the usual way, thereby rotating the sensor pairs 140', 140" with the blades. The pairs of strain sensors 140*a* and 140*c*, 140*b* and 140*d* measure the strain in the drive shaft 130 at each location. This measured strain is input to a processor (not shown) for calculation of bending moments as described below. The processor may be located in the FADEC or in the nacelle, in which cases the measured strains may for example be transmitted via a slip ring, telemetry and/or Wi-Fi from the rotating part to the static part and then to the FADEC or nacelle. This allows for real-time processing of the measured strains. If it is desirable to instead analyse data after a flight, it may also be possible to record and store data and download this at the end of the flight.

The combination of the sensors and the processor may together be considered as an apparatus or system.

The processor calculates the shaft bending moments from the measured strain values for each of the sensor pairs 140', 140" which correspond to the bending moments in the plane of each blade 120*a* and 120*c*, 120*b* and 120*d*. The bending moments calculated for each sensor pair location are then analysed to determine if the blade or blades associated with that sensor pair may be damaged, as is discussed further below.

It should be noted that in this context, a bending moment of a shaft is a bending moment of the shaft in the frame of reference of the shaft, i.e. with respect to the shaft, so the frame of reference is taken as rotating with the propeller drive shaft. This is not the same as a dynamic bending moment measured using a stationary object as the reference point and viewing the rotating propeller drive shaft as having a relatively rotating bending moment.

Figure 11:
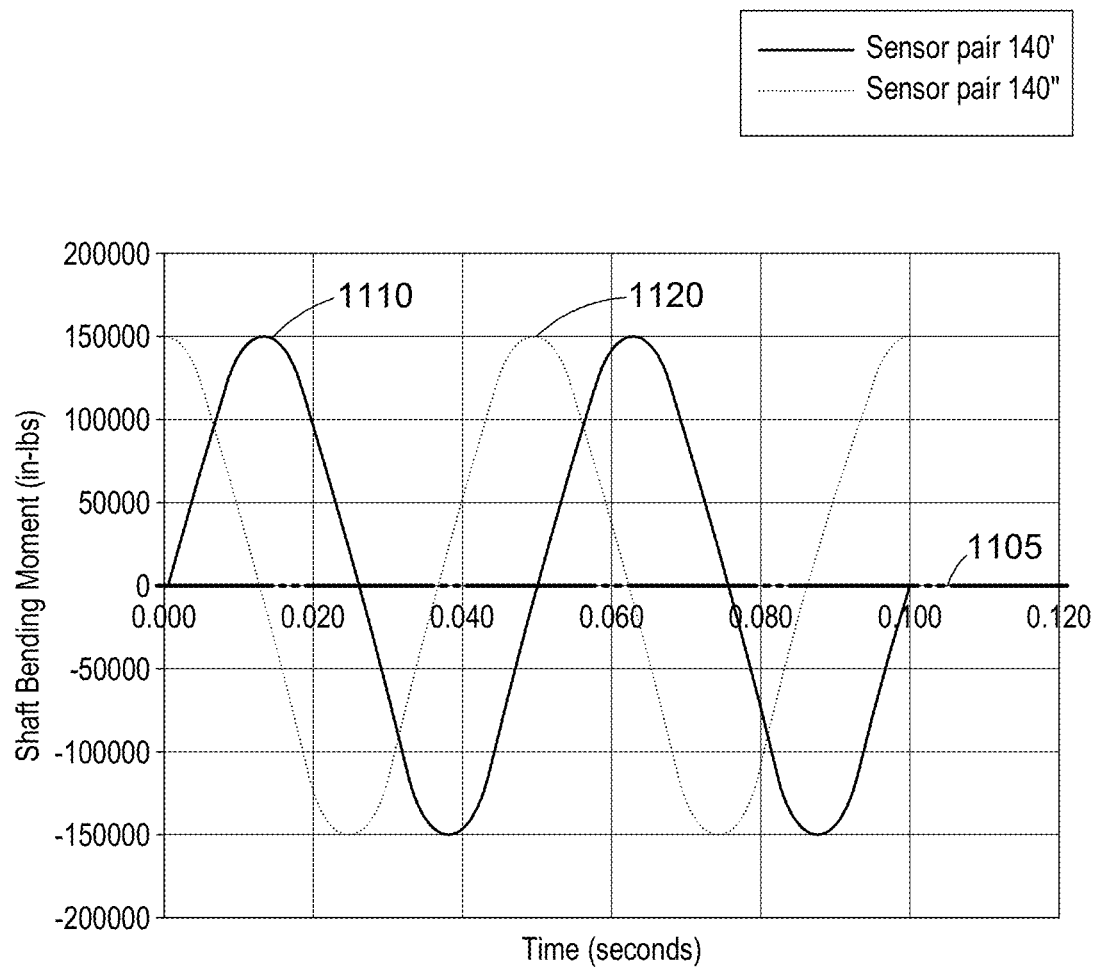
FIG. 11 is a graph illustrating the shaft bending moments measured by two of the sensor pairs using the arrangement of FIGS. 9 and 10 for a propeller having four healthy (i.e. undamaged) blades.

FIG. 11 illustrates graphically the shaft bending moments over time, for the propeller 110 of FIG. 9, calculated using strain data from both of the sensor pairs. The skilled person would readily appreciate how to calculate bending moment from measured strain data. In this case, the blades of the propeller 110 which correspond to these sensor pair measurements are healthy.

The solid line 1110 shows the bending moment of the drive shaft 130 over time in a first plane defined as a plane having a normal being a vector product of:
the diameter of the drive shaft 130 at the orientation at which the sensor pair 140' is connected thereto; and
the axis of rotation of the drive shaft 130.

The first plane rotates with the drive shaft, since the sensor pair 140' rotates with the drive shaft 130.

The dotted line 1120 shows the bending moment of the drive shaft 130 over time in a second plane defined as a plane having a normal being a vector product of:
the diameter of the drive shaft 130 at the orientation at which the sensor pair 140" is connected thereto; and
the axis of rotation of the drive shaft 130.

The sensor pair 140" is located at an orientation which is 90 degrees rotated about the axis of the drive shaft relative to the sensor pair 140'. The second plane rotates with the drive shaft 130, since the sensor pair 140" rotates with the drive shaft.

Both of the bending moments 1110, 1120 are sinusoids centred around a zero steady bending moment, shown by the dashed line 1105. In other words, although the drive shaft may at times during rotation bend in one direction in the respective plane and at other times during rotation bend in the opposite direction in the respective plane, the average bending moment is zero. This means that the thrust produced by the blades and the centrifugal force generated by the blades are equal, and is indicative of healthy propeller blades and thus a healthy propeller.

Figure 12:
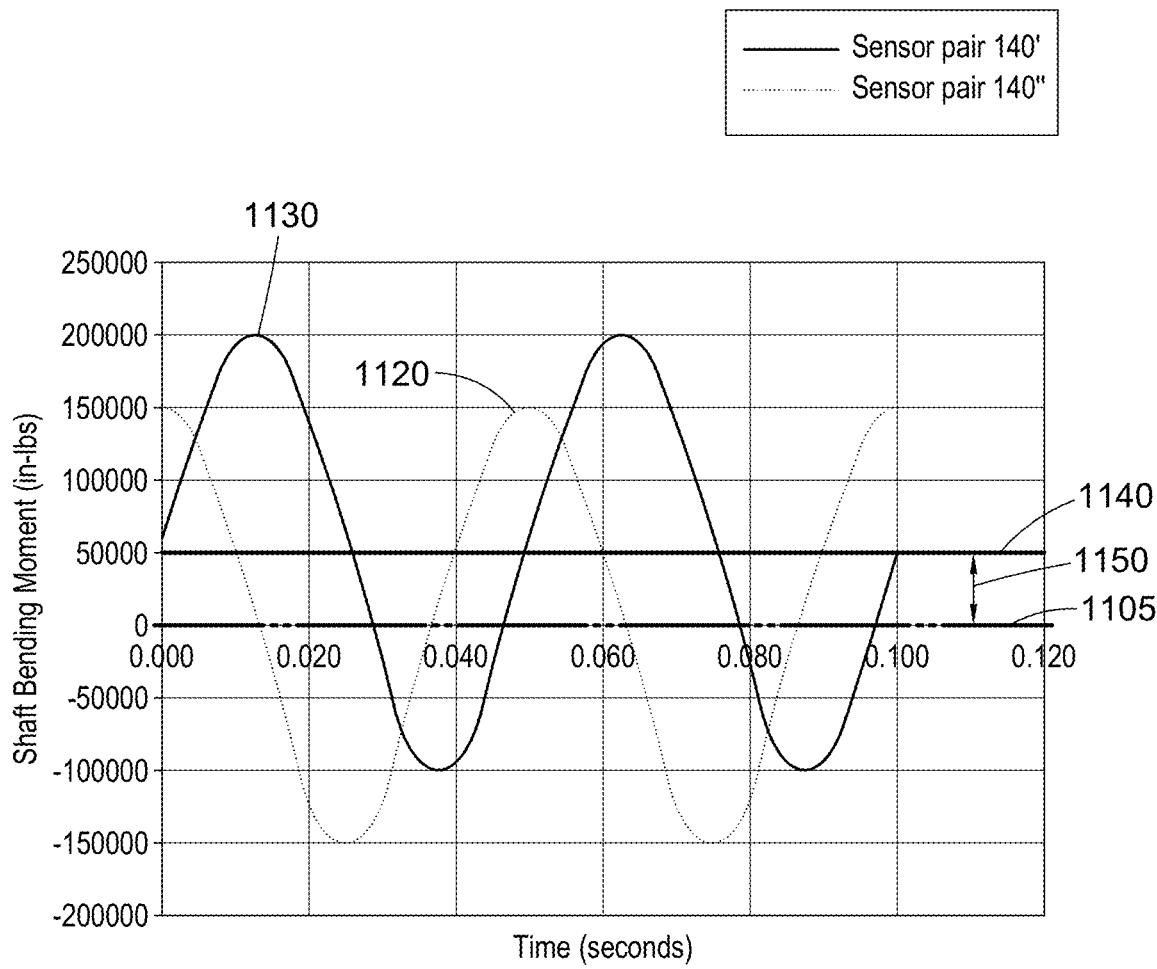
FIG. 12 is a graph illustrating the shaft bending moments measured by two of the sensor pairs using the arrangement of FIGS. 9 and 10, for a propeller having four blades, of which one pair of diametrically opposed blades is healthy (undamaged) and at least one blade is damaged.

Conversely, FIG. 12 illustrates graphically the shaft bending moments over time, for the propeller 110 of FIG. 9, in the case that at least one of the blades in the pair of blades corresponding to sensor pair 140' is damaged. As shown in FIG. 12, although the dotted line 1120 (representing the bending moment calculated using strain measurements from sensor pair 140") has not changed compared to FIG. 11 and is still centred about the zero bending moment indicated by dashed line 1105, the solid line 1110 (representing the bending moment calculated using strain measurements from sensor pair 140') has shifted to be centred about a non-zero steady bending moment, and is now labelled as line 1130. In this case, as the propeller has an even number of blades and each sensor pair corresponds to two blades, then one of the two blades corresponding to the sensor pair 140' has been damaged and so the bending moment has an average bending moment which is offset from zero bending moment. In other words, as the propeller drive shaft 130 rotates, it tends to bend more in one direction than it does in the opposite direction. The non-zero average bending moment, i.e. the steady bending moment, is given by solid line 1140 and the amount by which it is offset from a zero average bending moment 1105 is indicated by arrow 1150.

Since this embodiment is a four-bladed propeller, for all healthy blades which are not diametrically opposed across the propeller from a damaged blade, the measured steady bending moment will remain at zero. Thus the steady bending moment 1105 (i.e. the average bending moment) for the cyclic bending moment given by dotted line 1120, which corresponds to the measurement from the sensor pair 140" does not deviate from zero in this case as the corresponding blades are not damaged. The four bladed propeller is unique because the sensor pair (e.g. 140") aligned with an undamaged blade pair (140b, 140d) is on the neutral axis for a moment caused by damage to either (or both) of the other two blades (140a, 140c). Hence, the steady bending moment determined from measurements by the sensor pair aligned with the undamaged blades does not deviate from zero.

If, on the other hand, there are more blades with sensors, they will not be on the neutral axis and will respond to damage to the other blades. Thus, in other propeller embodiments where there are even numbers of blades greater than four or odd numbers of blades, as mentioned previously, even healthy blades will have a steady bending moment deviated from zero, but the magnitude will be less than the deviation for damaged blades.

It is the magnitude of the deviation from the zero bending moment for each sensor pair which is determined by the processor in order to establish if a blade or blades corresponding to the respective sensor pair is/are damaged, and thus whether the health of the propeller is impaired.

Depending on what damage has occurred, there may be a positive or negative steady bending moment, i.e. a positive or negative offset 1150 from zero, although the latter is not shown in FIG. 12. The quantity to be evaluated is therefore the magnitude of the offset 1150. If the magnitude of the offset 1150 exceeds a predetermined threshold, it is established that at least one of the blades corresponding to the sensor pair yielding the offset steady bending moment 1150 exceeding the threshold, is damaged.

Consequently, an alert for maintenance can be triggered and the identified blades of the propeller can be inspected for damage and repair or replacement work can be carried out. If the magnitude of the steady bending moment offset is below the predetermined threshold, it is established that the offset is not significant enough to be indicative of a damaged blade.

The threshold for the magnitude of the offset is specific to the particular propeller and may depend on various factors such as the number of blades, total thrust and blade diameter, both of which can affect the observed steady bending moments. For example, from a thrust-standpoint, even brand new blades which are intended to be identical may not be perfectly balanced (i.e. they may have inherent small thrust differences), due to manufacturing tolerances. Furthermore, there may be a bias in the observed steady bending moments due to a drift on the strain sensors because of temperature compensation. In order that such effects are not accidentally confused with steady bending moment offsets due to blade damage, it should be established empirically what is the extent of any offset present when the blades are healthy. A suitable offset threshold for blade damage can then be chosen which would clearly indicate a blade being damaged.

The skilled person would readily understand that an appropriate threshold can be established empirically from test data, e.g. data obtained during a flight test. This is well within the capability of the skilled person.

The above described method utilises a comparison with a threshold of the offset between a zero bending moment and the average bending moment, in order to detect a damaged blade (this is described in more detail later as "shaft method three", with reference to FIG. 15). However, in another method (described in more detail later as the "shaft method four", with reference to FIG. 16), the average, i.e. steady, bending moment corresponding to each sensor pair may be compared with that of the other sensor pair(s) in order to detect the presence of a damaged blade. This could be achieved for example by calculating the cumulative "error" in the steady bending moments determined from measurements by each pair of strain gauges as given by the following formula:

$$\text{error } SBM_n = \left[ \sum_{i=1}^{N} (SBM_n - SBM_i)^2 \right]^{0.5}$$

where n is the reference number for the strain gauge sensor pair in question and N is the total number of strain gauge sensor pairs.

From this, it can be established that the pair of strain gauges which gives rise to the largest "error" in the steady bending moment have a corresponding blade or blades which may be damaged.

Figure 13:
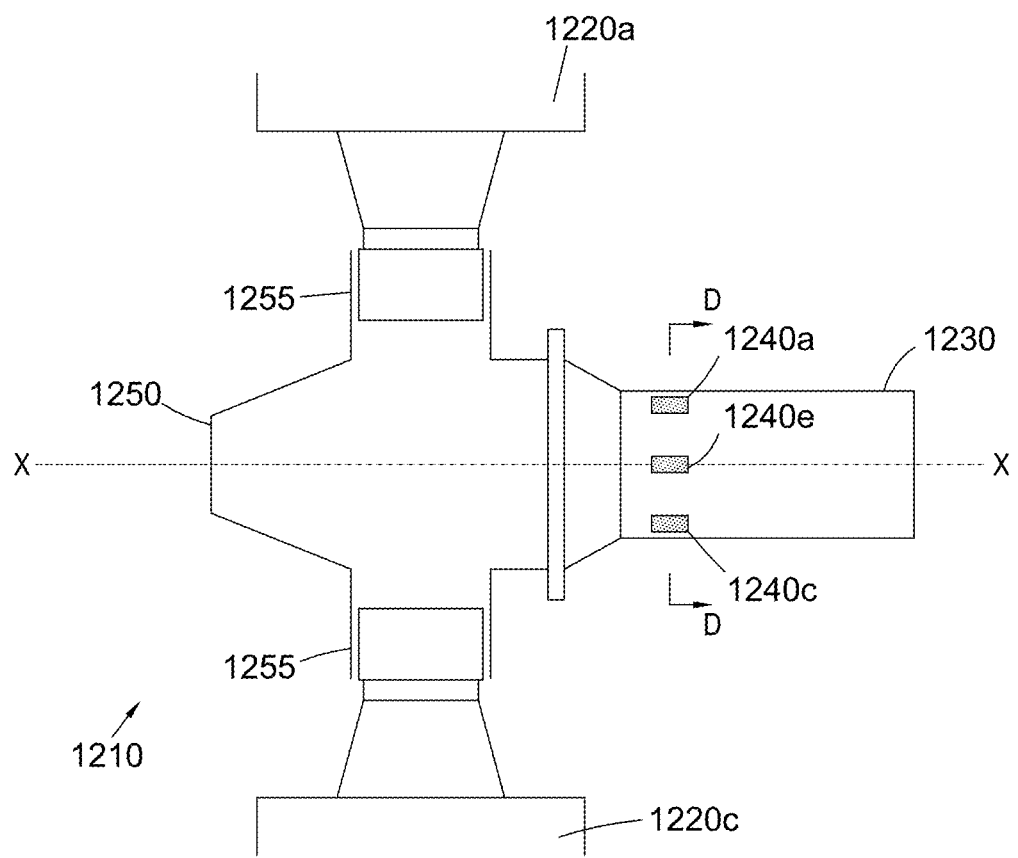
FIG. 13 shows schematically a fourth embodiment of a first propeller health monitoring arrangement for a propeller having three blades.

A fourth embodiment of the first propeller health monitoring arrangement in which a propeller with an odd number of blades is provided with sensor pairs is now described. FIG. 13 shows a propeller 1210 having three blades 1220a, 1220b (not shown) and 1220c. The blades 1220a, 1220b, 1220c are connected to the hub 1250 of the propeller 1210 via hub arms 1255. Attached to the propeller 1210 is a drive shaft 1230 having six sensors 1240a, 1240b, 1240c, 1240d, 1240e, 1240f, the arrangement of which can be seen more clearly in FIG. 14.

Figure 14:
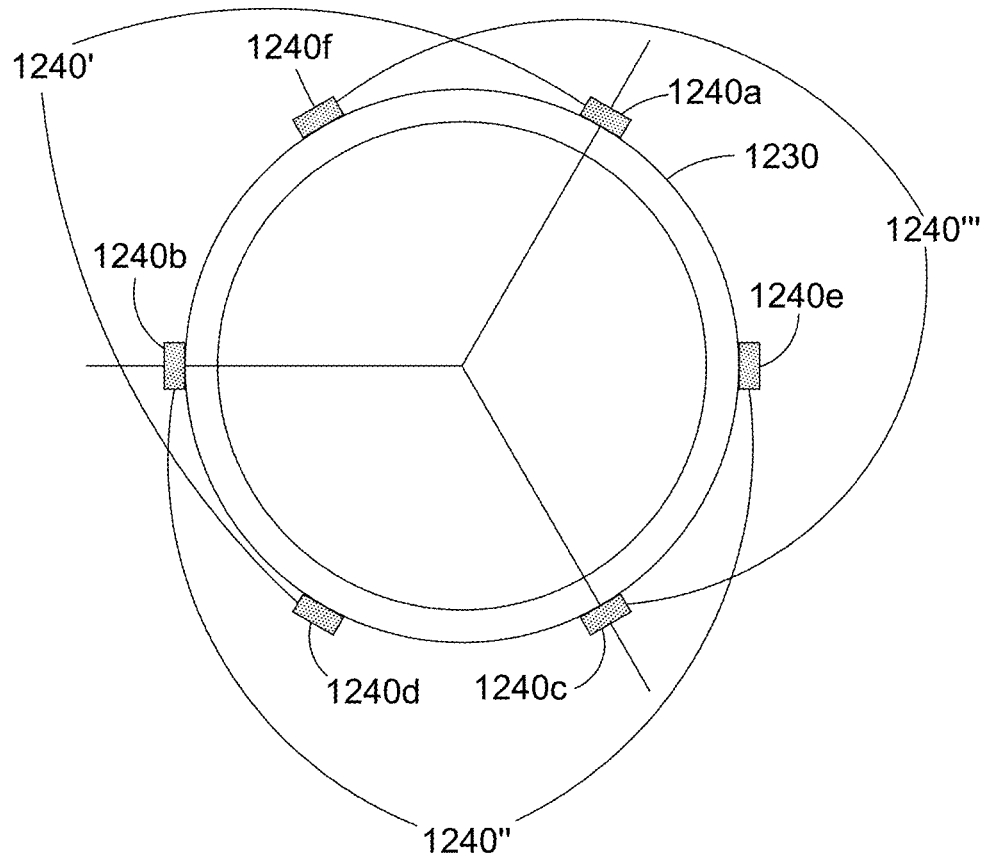
FIG. 14 shows a cross section of the drive shaft of FIG. 13, taken along the line D-D, the drive shaft having six sensors arranged in three diametrically opposed pairs mounted thereto.

FIG. 14 shows a cross section through the drive shaft along the line D-D in FIG. 13. The circumferential locations of each of the blades 1220a, 1220b and 1220c are indicated by radial lines. There are three pairs of sensors. Sensors 1240a and 1240d are aligned with blade 1220a (sensor pair 1240'). Sensors 1240b and 1240e are aligned with blade 1220b (sensor pair 1240"). Sensors 1240c and 1240f are aligned with blade 1220c (sensor pair 1240'"). Or, it may be considered that sensor 1240a is a primary sensor for blade 1220a and is aligned therewith, with sensor 1240d forming a diametrically opposed secondary sensor. Sensor 1240b is a primary sensor for blade 1220b and is aligned therewith, with sensor 1220e forming a diametrically opposed secondary sensor. Sensor 1240c is a primary sensor for blade 1220c and is aligned therewith, with sensor 1220f forming a diametrically opposed secondary sensor. Thus for a propeller having an odd number N of blades, there will be N pairs of sensors, i.e. 2N sensors in total. In this case, no two blades share a sensor pair.

The bending moments determined from strain measurements made by the strain sensors 1240a-f when plotted graphically would resemble those shown in FIG. 11 for a healthy propeller having an even number of blades. That is, the sinusoidal bending moments would be centred around an average bending moment of zero, i.e. have a zero steady bending moment. However, if a blade was to become damaged, the steady bending moments for all of the blades would be offset from zero, while the offset of the steady bending moment determined from strain measurements made by the sensor pair corresponding to the damaged blade would have the greatest magnitude.

Shaft method three and shaft method four for monitoring the health of a four-bladed propeller, as described above, can also be used with this fourth embodiment of the disclosure.

In shaft method three, the magnitude of the offset steady bending moments can be compared against a threshold. Since the magnitude of the offset steady bending moment corresponding to the damaged blade will be the largest, the threshold can be selected such that only significantly large offsets will exceed the threshold. Thus the damaged blade can be identified. Alternatively, the greatest steady bending moment offset may be considered indicative of a blade which is damaged.

In shaft method four, the steady bending moment corresponding to each sensor pair may be compared with that of the other sensor pairs in order to detect the presence of a damaged blade. This could be achieved for example by calculating the cumulative "error" in the steady bending moments corresponding to each pair of strain gauges as given by the following formula:

$$\text{error } SBM_n = \left[ \sum_{i=1}^{N} (SBM_n - SBM_i)^2 \right]^{0.5}$$

where n is the reference number for the strain gauge sensor pair in question and N is the total number of strain gauge sensor pairs.

From this, it can be established that the pair of strain gauges which gives rise to the largest "error" in the steady bending moment has a corresponding blade which may be damaged.

Figure 15:
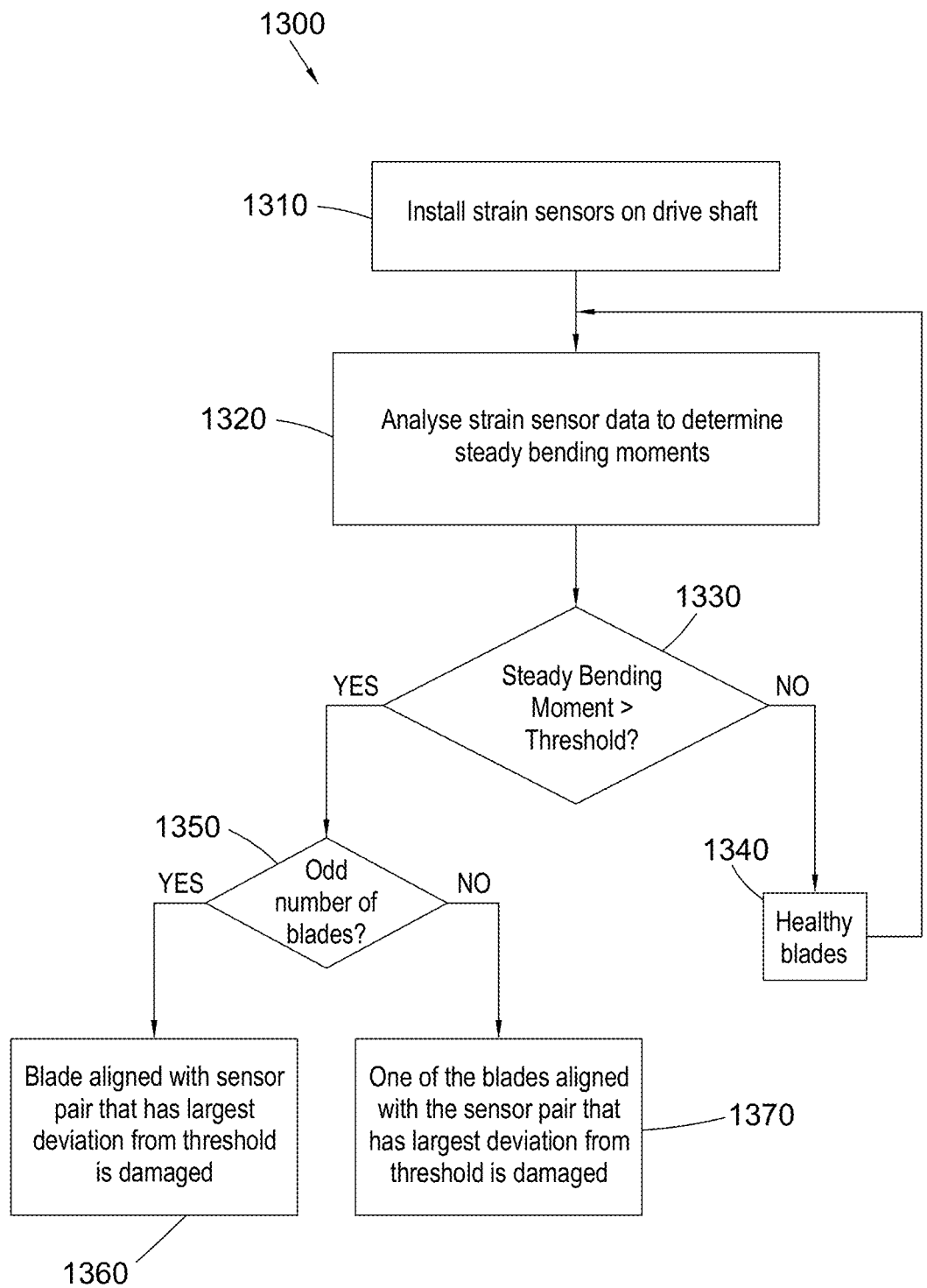
FIG. 15 shows a flow diagram of a method for monitoring propeller health using the arrangements of FIGS. 9, 10, 13 and 14, herein called "shaft method three"

FIG. 15 describes in more detail the "shaft method three" 1300 for a propeller with an even or an odd number of blades. At step 1310, a pair of strain gauge sensors is installed on the drive shaft of the propeller corresponding to each blade. In each sensor pair, one sensor is circumferentially aligned with the blade, while the other is located at a diametrically opposite position on the drive shaft. For an N-bladed propeller, if N is even, there will be N/2 sensor pairs, since diametrically opposed blades will share a sensor pair. If N is odd, there will be N sensor pairs. Each sensor pair is set up to measure a bending moment (BM).

At step 1320, the strain sensor data is analysed to determine the steady bending moment corresponding to each sensor. This includes using a processor to convert the strain measurements to bending moments and perform various algorithms. A first algorithm calculates the time taken for one revolution of the propeller, given by (RPM/60)^-1. A second algorithm records the maximum and minimum bending moment measured by each sensor pair in each revolution. A third algorithm calculates the steady bending moment (SBM) for each sensor pair in each revolution by taking the average of the recorded maximum and minimum bending moments, i.e. (max+min)/2.

At step 1330, the magnitudes of the calculated steady bending moments (SBM) corresponding to each sensor pair are compared to a threshold. A decision is taken as to whether the steady bending moment magnitudes exceed the threshold. If this not the case, then at step 1340, the blades are deemed healthy and the method returns to step 1320. Otherwise, if the steady bending moment magnitudes do exceed the threshold, then the method proceeds with step 1350.

At step 1350, the method determines if the propeller has an odd number of blades. If this is the case, then it is established at step 1360 that the blade aligned with the sensor pair yielding the largest steady bending moment exceeding the threshold is damaged. Otherwise, if there is an even number of blades, then it is established at step 1370 that the blade aligned with the primary sensor of the sensor pair (and/or the blade diametrically opposite) yielding the largest steady bending moment exceeding the threshold is damaged.

The identified blade or pair of blades can then be inspected for maintenance at a later point and an alert for this can be raised.

Figure 16:
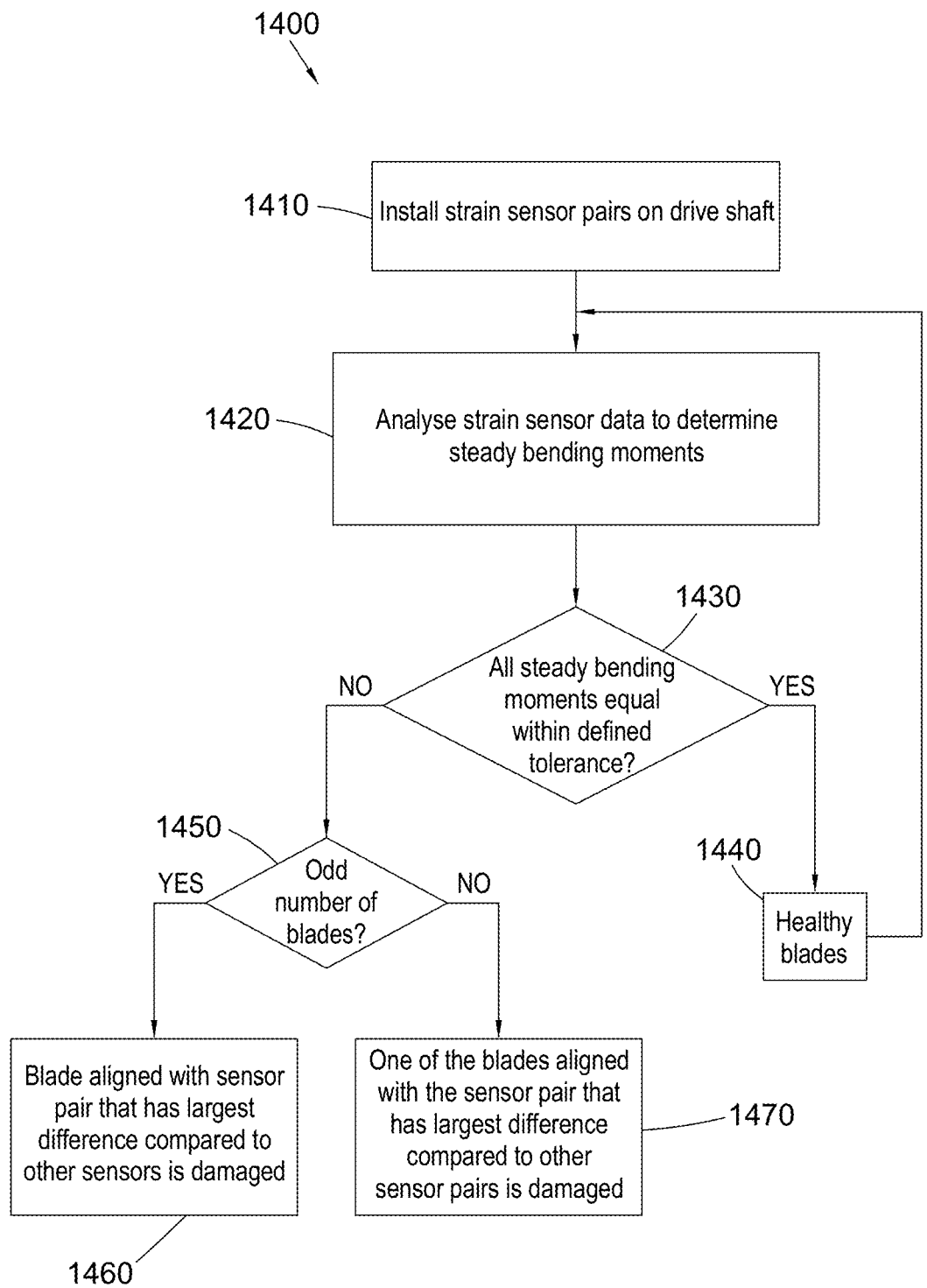
FIG. 16 shows a flow diagram of another method for monitoring propeller health using the arrangements of FIGS. 9, 10, 13 and 14, herein called "shaft method four"

FIG. 16 describes in more detail "shaft method four" 1400 for a propeller with an even or an odd number of blades. At step 1410, a pair of strain gauge sensors (e.g. full bridge strain gauges) is installed on the drive shaft of the propeller corresponding to each blade. In each sensor pair, one sensor is circumferentially aligned with the blade, while the other is located at a diametrically opposite position on the drive shaft. For an N-bladed propeller, if N is even, there will be N/2 sensor pairs, since diametrically opposed blades will share a sensor pair. If N is odd, there will be N sensor pairs. Each sensor pair is set up to measure a bending moment (BM).

At step 1420, the strain sensor data is analysed to determine the steady bending moment corresponding to each sensor. This includes using a processor to convert the strain measurements to bending moments and perform various algorithms. A first algorithm calculates the time taken for one revolution of the propeller, given by (RPM/60)^−1. A second algorithm records the maximum and minimum bending moment measured by each sensor pair in each revolution, i.e. (max+min)/2. A third algorithm calculates the steady bending moment (SBM) for each sensor pair in each revolution by taking the average of the recorded maximum and minimum bending moments.

At step 1430, the magnitudes of the calculated steady bending moments (SBM) corresponding to each sensor pair are compared to each other. For example, the cumulative "error" in the steady bending moments corresponding to each pair of strain gauges may be calculated as given by the following formula:

$$\text{error } SBM_n = \left[ \sum_{i=1}^{N} (SBM_n - SBM_i)^2 \right]^{0.5}$$

where n is the reference number for the strain gauge sensor pair in question and N is the total number of strain gauge sensor pairs. From this, it can be established that the pair of strain gauges which give rise to the largest "error" in the steady bending moment has a corresponding blade (or blades) which may be damaged. It is then decided as to whether the steady bending moments are equal within a defined tolerance. Thus if all of the "error"s calculated above are within a defined tolerance, such as for example, a 3%, 5%, 10%, 15% or 20% tolerance, the blades are deemed at step 1440 to be healthy and the method returns to step 1420. Otherwise, if all of the "error"s calculated above are not within a defined tolerance, such as for example, a 3%, 5%, 10%, 15% or 20% tolerance, then the method proceeds with step 1450.

At step 1450, the method determines if the propeller has an odd number of blades. If this is the case, then it is established at step 1460 that the blade aligned with the sensor pair which yields the largest "error" compared to the "error" of the other sensor pairs, or which has the largest difference in steady bending moment compared to the steady bending moments yielded by other pairs, is damaged. Otherwise, if there is an even number of blades, then it is established at step 1470 that at least one of the blades aligned with the sensor pair which yields the largest "error" compared to the "error" yielded by the other sensor pairs, or which has the largest difference in steady bending moment compared to the steady bending moments yielded by the other pairs, is damaged.

An alert (e.g. a visual or aural indicator) can then be raised and the identified blade or pair of blades can then be inspected for maintenance.

The above embodiments relate to a first propeller health monitoring arrangement in which strain sensors are located on the propeller drive shaft. However, a second propeller health monitoring arrangement is also provided, in which strain sensors are located on hub arms of the propeller. Embodiments of such a second arrangement are now described.

The inventors have realised that damage to blades of a propeller can also be detected by, in a second arrangement, placing strain sensors on hub arms of a propeller, with each strain sensor corresponding to a propeller blade. Each strain sensor must be circumferentially aligned with the propeller blade, e.g. offset from the propeller blade along a line parallel to the rotational axis of the propeller (axially offset). Each strain sensor should also be located radially inward of the propeller blade with which it is associated, and along a radial line extending from a central axis of the propeller hub along the blade. Thus, for a propeller having a plurality of blades extending radially outwardly from hub arms of a propeller hub, which in turn extend radially outwardly from a central axis extending through the propeller and a propeller drive shaft, strain sensors can be provided corresponding to each of the blades, preferably on an axially forward side of the hub arm of the corresponding blade, each crossing a plane defined by the radial direction of the corresponding blade and the central axis, the plane being bounded by the central axis.

The strain sensors measure strain over time, e.g., continuously or periodically. The cyclic response of each strain sensor is a sinusoid in shape. Each of the strain sensors produces a sinusoid which is phase shifted by $2\pi/N$ radians where N is the number of blades on the propeller. Thus, for example, in a propeller having 4 blades (N=4), the sinusoids are consecutively phase shifted by $\pi/2$ radians, or 90 degrees. The sinusoids may also be known as the "once-per-revolution cyclic response", or "1P cyclic response". For a propeller having healthy, identical blades, the sinusoids will have equal amplitude.

However, if a blade is damaged, the natural frequency at the first mode of the blade may change. Additionally or alternatively, the torsional stiffness of the blade may change. Consequently, the 1P cyclic response will change compared to the other blades. The change which occurs may be an increase or a decrease of the blade dynamic magnification, depending on the relationship between the first mode natural frequency and the once-per-revolution forcing frequency.

For example, reduction in torsional stiffness of a blade due to damage will result in increased blade twist magnification, which increases the 1P cyclic response relative to the other blades. This can be seen as a change in amplitude of the sinusoid. Thus, by measuring a change in amplitude of the sinusoidal response of the strain sensors, damaged blade(s) can be identified.

It will be recognised that in this second propeller health monitoring arrangement, the strain measurements (i.e. the strain sensor outputs) are used directly. Bending moment is not calculated from these strain measurements.

Figure 17:
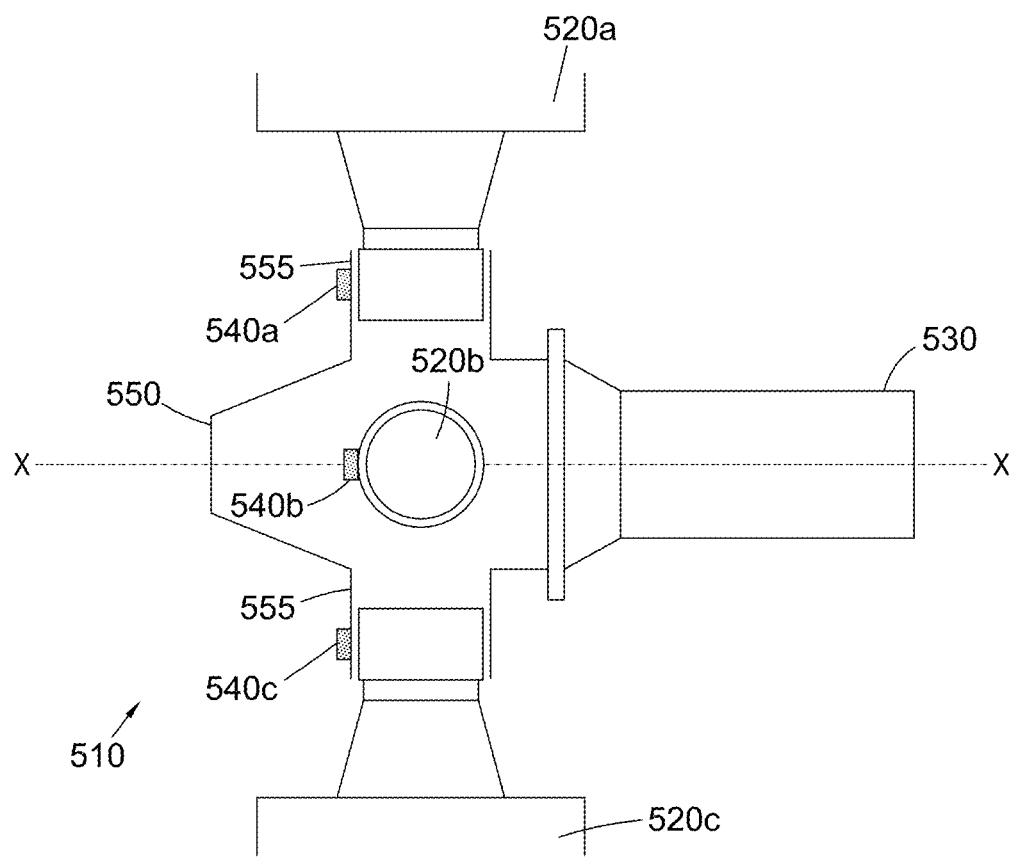
FIG. 17 shows schematically a first embodiment of a second propeller health monitoring arrangement for a propeller having four blades.

FIG. 17 shows such a second arrangement, in which a propeller 510 is connected to a drive shaft 530. The propeller 510 has a hub 550 having hub arms 555, and four blades 520*a*, 520*b*, 520*c*, 520*d* (fourth blade 520*d* not shown), each extending from one of the hub arms 555, radially outwardly from a rotational axis X of the propeller 510 and the drive shaft 530. Four strain sensors 540*a*, 540*b*, 540*c*, 540*d* (fourth sensor 540*d* not shown) are provided, each located on a front-facing surface of a hub arm 555, such that strain sensors 540*a*, 540*b*, 540*c*, 540*d* are circumferentially aligned with a respective blade 520*a*, 520*b*, 520*c*, 520*d*. Thus sensor 540*a* is aligned with blade 520*a*, sensor 540*b* is aligned with blade 520*b*, sensor 540*c* is aligned with blade 520*c* and the fourth sensor 540*d* is aligned with the fourth blade 520*d* (neither is shown in FIG. 17). This arrangement is exemplary only and other embodiments may have other numbers of blades, where some, preferably all of the blades each has a corresponding sensor located at a corresponding hub arm.

In use, the propeller drive shaft 530 will rotate in the usual way, thereby rotating the blades 520a, 520b, 520c, 520d and the corresponding sensors 540a, 540b, 540c, 540d. The sensors measure the strain in the hub arms 555 on which they are located, over time.

This measured strain is input to a processor (not shown) which may be located in the FADEC or in the nacelle, in which cases the measured strains may for example be transmitted via a slip ring, telemetry and/or Wi-Fi from the rotating part to the static part and then to the FADEC or nacelle. This allows for real-time processing of the measured strains. If it is desirable to instead analyse data after flight, it may also be possible to record and store data and download this at the end of the flight.

The processor calculates the cyclic strain of the hub arms 555 from the measured strain values for each of the sensors 540a, 540b, 540c and 540d which corresponds to the cyclic response at an angular location of each respective blade 520a, 520b, 520c and 520d. The skilled person would readily understand how the cyclic responses may be calculated from the measured strain values, in particular since the strain gauges are set up to record vibratory strain in micro strain. The cyclic response calculated for each sensor location is then analysed to determine if the blade associated with that sensor may be damaged, as is discussed further below.

Figure 18:
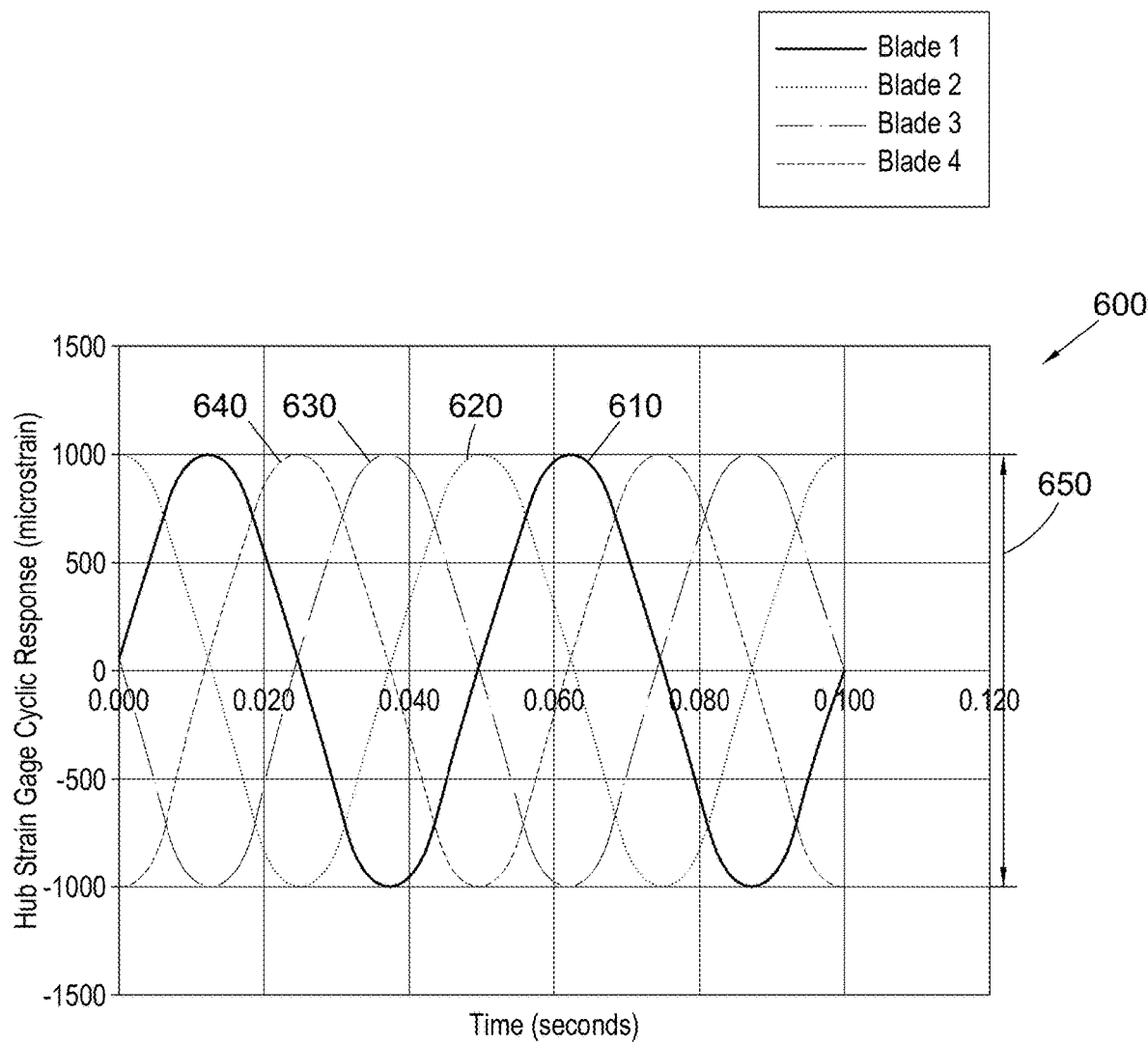
FIG. 18 is a graph illustrating the cyclic strain gauge response measured using the arrangement of FIG. 17, when all four blades are healthy (i.e. undamaged)

FIG. 18 illustrates graphically 600 the cyclic blade response of the four-blade propeller 510 of FIG. 17, based on the strain measurements from the sensors 540a, 540b, 540c and the fourth sensor 540d (not shown in FIG. 17), over time. In this case, the blades of the propeller 510 are healthy as will be discussed further below.

The solid line 610 corresponds to the cyclic blade response for a first blade 520a, as measured by a first sensor 540a. The dotted line 620 corresponds to the cyclic blade response for a second blade 520b, as measured by a second sensor 540b. The dot-dashed line 630 corresponds to the cyclic blade response for a third blade 540b, as measured by a third sensor 540c. The dashed line 640 corresponds to the cyclic blade response for a fourth blade 520d, as measured by a fourth sensor 540d.

As is clear from FIG. 18, for four healthy blades, the cyclic blade responses 610, 620, 630, 640 are identical, depicted as sinusoids, with a phase shift of 90 degrees between each consecutive sinusoid due to the different orientations of the blades and their respective sensors around the propeller. In particular, the peak-to-peak amplitude 650 of each of the cyclic blade responses is the same.

Figure 19:
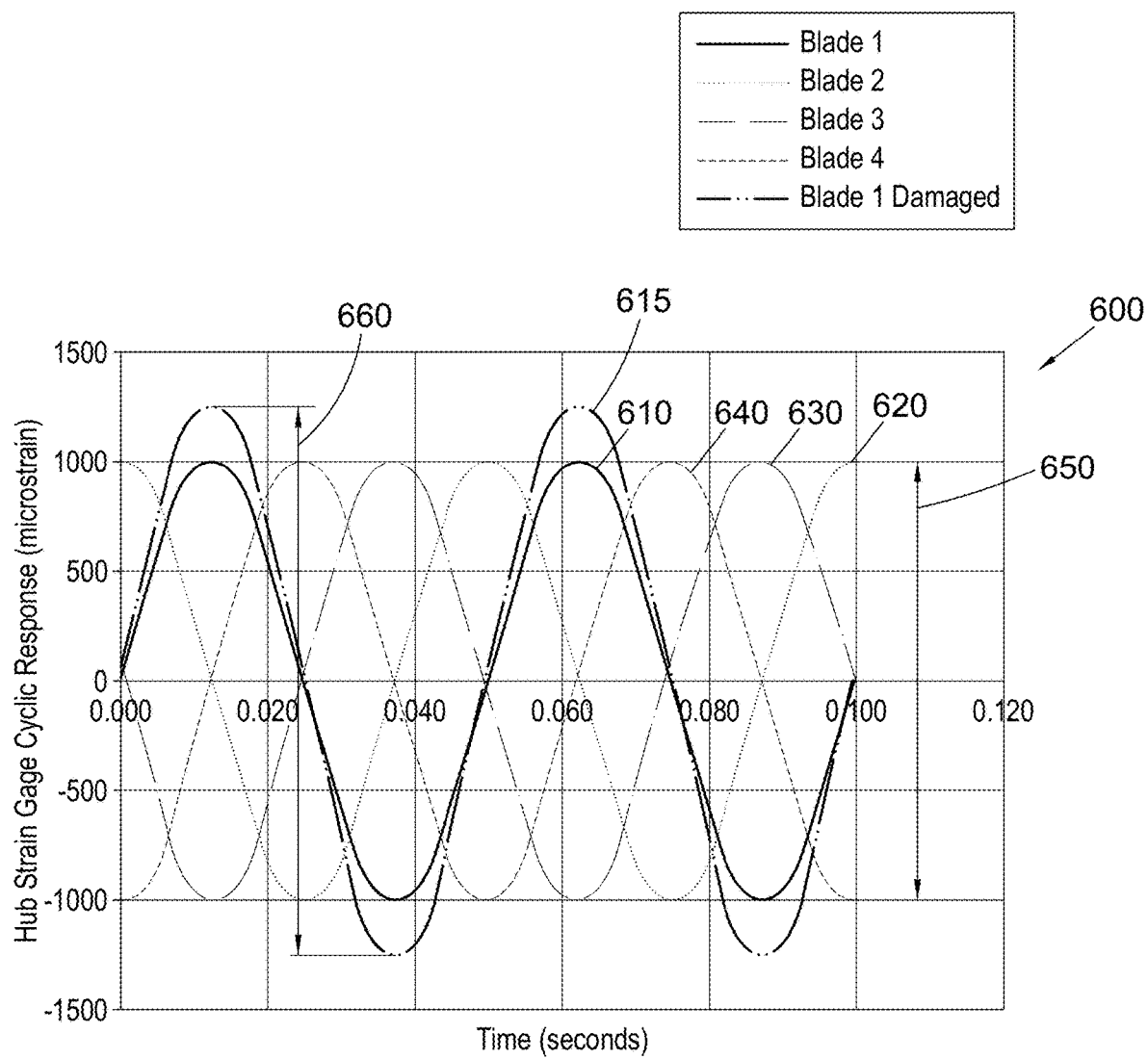
FIG. 19 shows the graph of FIG. 18, on which there is superimposed an exemplary cyclic strain gauge response if one of the four blades is damaged.

Conversely, FIG. 19 is a copy of FIG. 18, but having superimposed thereon a further blade cyclic response 615, given by a dot-dot-dashed line, representing the case where there has been damage to the first blade 520a. In this exemplary scenario, the first blade 520a has been damaged and has a reduced torsional stiffness, resulting in increased blade twist magnification, which increases the 1P cyclic response relative to the other blades.

It can clearly be seen how the cyclic response 610 of the first blade 520a changes when it is damaged, i.e. the peak-to-peak amplitude of the cyclic strain measurements increases, as indicated by arrow 660. Arrow 650 indicates the amplitude of the 1P cyclic response for healthy blades, compared to the exemplary 1P cyclic response for the damaged first blade 520a, given by arrow 660.

Although FIG. 19 depicts an increase in the amplitude of the 1P cyclic response for a damaged blade, depending on the extent and type of damage, there may alternatively be a decrease in amplitude of the 1P cyclic response for the damaged blade. Consequently, when monitoring the amplitudes of the 1P cyclic responses, the peak-to-peak amplitudes may be compared and a percentage difference between the peak-to-peak amplitudes should be determined. The comparison of the peak-to-peak amplitudes may take the form:

$$\text{abs}[(\text{``}650\text{''}-\text{``}660\text{''})/\text{``}650\text{''}]$$

i.e. the absolute value of the difference between a healthy blade peak-to-peak amplitude (650) and a damaged blade peak-to-peak amplitude (660) as a percentage of a healthy blade peak-to-peak amplitude (650). The numbers "650" and "660" refer to the peak-to-peak amplitudes indicated in FIG. 19. Irrespective of whether it is a percentage increase or decrease in relative amplitude, if the magnitude of that percentage difference exceeds a threshold, then this is indicative that there is a damaged blade. The blade corresponding to the sensor that is providing the 1P cyclic response with the irregular amplitude is then determined. Consequently, an alert for maintenance can be triggered and the identified blade of the propeller can be inspected for damage and repair or replacement work can be carried out. This method is termed herein the "hub method", and will be described in more detail below with reference to FIG. 21.

Figure 20:
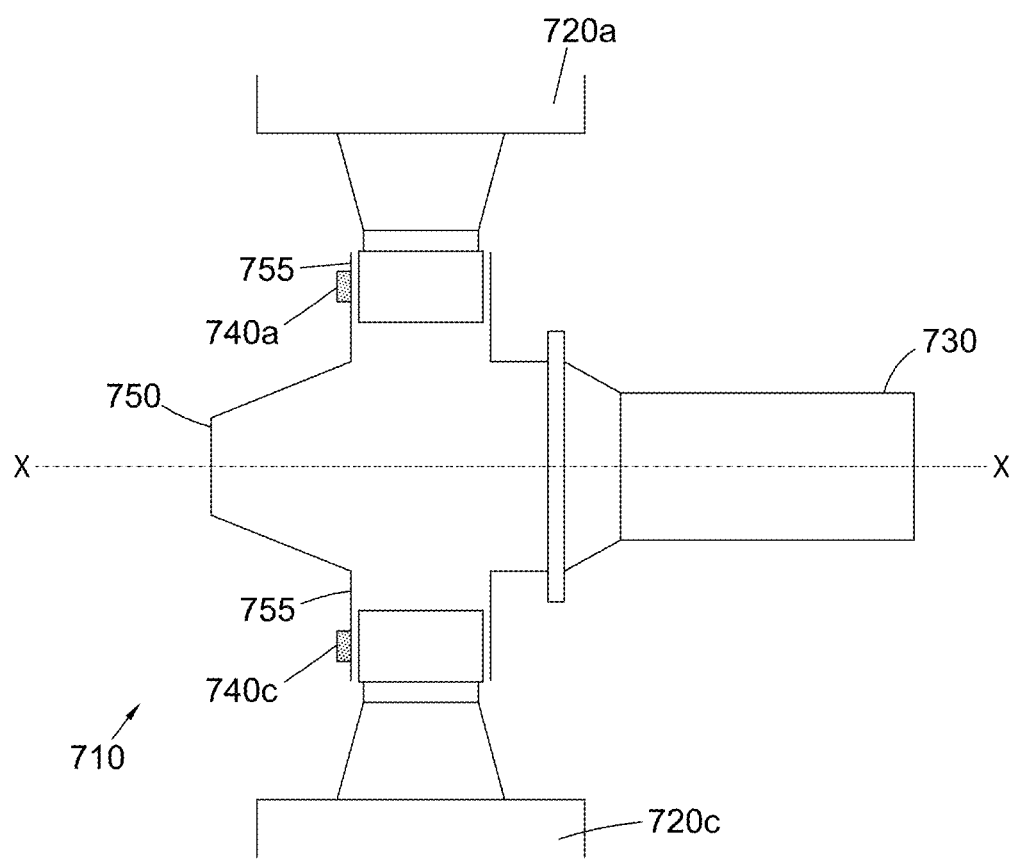
FIG. 20 shows schematically a second embodiment of a second propeller health monitoring arrangement for a propeller having three blades.

FIG. 20 shows a second embodiment of a second propeller health monitoring arrangement, in which the propeller has an odd number of blades, in this case three. Propeller 710 has a hub 750 with hub arms 755 from which three blades 720a, 720b (not shown) and 720c extend. The propeller is driven by a drive shaft 730 having a rotational axis X common with the propeller 710. Mounted on the front facing surfaces of the hub arms 755 are strain sensors 740a, 740b (not shown) and 740c, each strain sensor corresponding to a particular blade 220a, 220b and 220c respectively. The same hub method as has been described above (and will now be described below with respect to FIG. 21) is applicable to a propeller having an even number or an odd number of blades.

Figure 21:
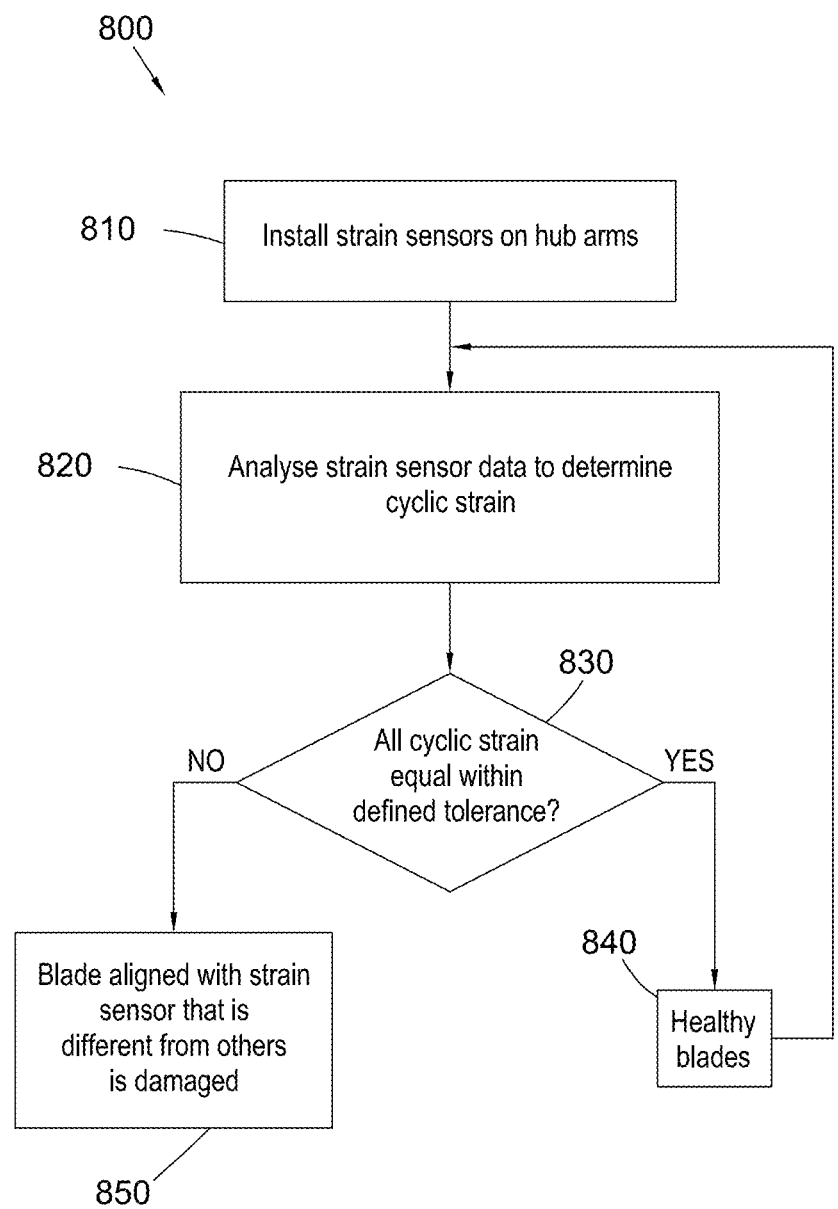
FIG. 21 shows a flow diagram of a method for monitoring propeller health using the arrangements of FIGS. 17 and 20, herein called "hub method".

FIG. 21 shows the "hub method" 800 for identifying damaged blades for a propeller with any number of blades. At step 810, strain gauges with a full-bridge arrangement are installed on the hub arms of the propeller, aligned with each blade.

At step 820, strain sensor data is analysed by a processor to determine the cyclic strain. Various algorithms may be performed. A first algorithm may calculate the time taken for one revolution of the propeller, given by (RPM/60)^−1. A second algorithm may record the maximum and minimum strains measured by each strain gauge sensor in each revolution. A third algorithm may calculate the cyclic strain amplitude (CycStr) in each revolution by calculating half of the peak-to-peak amplitude (i.e. (max−min)/2) using the recorded maximum and minimum strains. A fourth algorithm may compare the cyclic strain amplitudes to each other. This fourth algorithm may be carried out for example by calculating the cumulative "error" in the cyclic strain amplitude measured by each strain gauge as given by the following formula:

$$\text{error } CycStr_n = \left[\sum_{i=1}^{N} (CycStr_n - Cycstr_i)^2\right]^{0.5}$$

where n is the reference number for the strain gauge sensor in question and N is the total number of strain gauge sensors. From this, it can be established that the strain gauge which gives rise to the largest "error" in the cyclic strain amplitude has a corresponding blade which may be damaged.

At step 830, a decision is taken as to whether the cyclic strain amplitudes are equal within a defined tolerance. Thus if all of the "error"s calculated above are within a defined tolerance, such as for example, a 3%, 5%, 10%, 15% or 20% tolerance, the blades are deemed at step 840 to be healthy and the method returns to step 820. Otherwise, if all of the "error"s calculated above are not within a defined tolerance, such as for example, a 3%, 5%, 10%, 15% or 20% tolerance, then the method proceeds with step 850.

At step 850, it is established that the blade aligned with the sensor which has the largest "error" in cyclic strain amplitude compared to the "error" of the other sensors, or which has the largest difference in cyclic strain amplitude compared to the cyclic strain amplitudes of the other sensors is damaged.

The identified blade can then be inspected for maintenance at a later point and an alert for this can be raised.

Although the above first (sensors on shaft) and second (sensors on hub arms) arrangements have been described separately, it is also envisioned that the two may be used in conjunction. For example, a propeller may have strain sensors both on the propeller hub arms and on the propeller drive shaft. The bending moments of the shaft can be monitored according to one of the shaft methods described for the first arrangement above, using the sensors on the drive shaft. If the propeller has an even number of blades and so it is unclear from using the methodology of the first arrangement which blade of two diametrically opposed blades is damaged, then the sensors on the hub arms could be used to identify which of the two diametrically opposed blades is damaged, in the manner described above for the second arrangement having hub arm sensors (i.e. the hub method).

The two above-described arrangements are not limited to propellers having four blades, but may have any number of blades, including an odd number of blades.

The above embodiments describe the use of strain sensors. It will be appreciated that this term covers any sensor able to measure strain. Strain sensors may be referred to as strain gauges.

Typically, a strain gauge will measure a deformation (strain) as a change in electrical resistance. Such strain gauges may be termed "load cells".

A particularly useful type of strain sensor for use in embodiments of the disclosure is a full bridge strain gauge. Such strain gauges typically utilise foil strain sensors. In a foil strain sensor, when an object is deformed, the foil is deformed, causing its electrical resistance to change. Thus, the change in electrical resistance is dependent on the strain experienced. This change in resistance is measured in order to provide a measurement of the strain. In a full bridge strain gauge, there are four active strain sensors (e.g. four foil strain sensors), which provides a very high sensitivity to bending strain. Furthermore, a full bridge strain gauge provides excellent signal to noise ratio, rejects axial strain, compensates for temperature effects and compensates for lead wire resistance. However, half bridge strain gauges may also be used, comprising two active strain sensors (e.g. two foil strain sensors), or quarter bridge strain gauges comprising one active strain sensor. Such full, half and quarter bridge strain gauges may be used as the "strain sensors" of the present disclosure. I.e., the foil sensors within such gauges would not be individually used as a strain sensors, rather it is a gauge made from foil sensors that would be used as a strain sensor to implement this disclosure.

It will be appreciated that the methods and systems of the disclosure as discussed above provide significant advantages over prior art methods for assessing propeller health. The health of a propeller may be monitored in real time during normal use of the aircraft, thus the aircraft does not need to be grounded for checks to be made. The method is simple to implement, requiring only strain measurements to be made using readily available strain sensors, and a processor for carrying out the processing steps. Thus, no complex equipment is required. Moreover, the processing required is not onerous, no complex models need to be created or used as in some prior art methods. In the case of drive shaft strain measurements, only simple calculations of steady bending moment and a comparison to a threshold is required. In the case of hub strain measurements, only the calculation of cyclic strain amplitudes and a comparison with other amplitudes is required. Thus, only minimal processing power is needed. Moreover, the particular blade pair, or indeed in certain embodiments the specific blade that is damaged can be positively identified, thus enabling quick maintenance.

Additionally, the lifetime of the drive shaft can be improved, since maintenance of the damaged blades at the correct time can avoid prolonged steady bending of the drive shaft.

Furthermore, maintenance of the propeller can be restricted to those propeller blades which have been identified as being potentially damaged and unnecessary maintenance checks on healthy propellers need not be carried out.

Further aspects will be evident to the skilled person, in accordance with the disclosure as defined in the claims.

The following numbered clauses set out features of the disclosure which may serve as basis for future amendments or divisional applications:

1. A method of monitoring the health of an aircraft propeller whilst the propeller is in operation, the propeller having a plurality of blades extending radially outwardly from a central axis extending through the propeller and a propeller drive shaft, the method comprising: measuring the strain in the propeller drive shaft using multiple primary strain sensors, each primary strain sensor providing a respective strain measurement; wherein the primary strain sensors are located around a circumference of the drive shaft of the propeller; and wherein each strain sensor is located such that it crosses a plane defined by the radial direction of a blade and the central axis, the plane being bounded by the central axis.

2. A method as described in clause 1, further comprising measuring strain in the propeller drive shaft using multiple secondary strain sensors, each secondary strain sensor being located around the circumference of the drive shaft diametrically opposite to a respective primary strain sensor and forming a sensor pair therewith.

3. A method as described in clause 1 or 2, further comprising: receiving measured strain data from each primary strain sensor or each strain sensor pair; and calculating a respective steady bending moment of the drive shaft using the strain data received from each primary strain sensor or each strain sensor pair.

4. A method as described in clause 3, further comprising comparing the magnitude of the calculated steady bending moments to a threshold.

5 A method as described in clause 4, further comprising: establishing that the health of the propeller may be impaired if the magnitude of the steady bending moment of the drive shaft is above a threshold; and preferably indicating an alert for maintenance if it is established that the health of the propeller may be impaired.

6. A method as described in clause 3, 4 or 5, further comprising comparing the magnitude of the calculated steady bending moments to one another.

7. A method as described in clause 6, further comprising establishing that the health of the propeller may be impaired if the magnitude of one of the steady bending moments of the drive shaft is outside of a tolerance of the other steady bending moments of the drive shaft; and preferably indicating an alert for maintenance if it is established that the health of the propeller may be impaired.

8. A method as described in clause 5 or 7, further comprising: for a propeller having an odd number of blades, identifying a damaged blade, by identifying the blade or blades corresponding to the primary sensor or sensor pair which has measured the strain data which has led to a steady bending moment being calculated which has a magnitude above the threshold and/or which is outside of the tolerance of the other steady bending moments of the drive shaft; and preferably indicating an alert for maintenance of the identified blade.

9. A method as described in clause 5 or 7, further comprising: for a propeller having an even number of blades, identifying which two diametrically opposed blades may include at least one damaged blade, by identifying the blades corresponding to the primary sensor or sensor pair which has measured the strain data which has led to a steady bending moment being calculated which has a magnitude above the threshold and/or which is outside of the tolerance of the other steady bending moments of the drive shaft; and preferably indicating an alert for maintenance of the identified blades.

10. A method as described in any preceding clause, wherein the strain sensors are full bridge strain gauges.

11. A method of monitoring the health of an aircraft propeller whilst the propeller is in operation, the propeller having a plurality of blades extending radially outwardly from hub arms of a propeller hub, which in turn extend radially outwardly from a central axis extending through the propeller and a propeller drive shaft, the method comprising measuring the strain in each of at least some of the hub arms using strain sensors, each of the strain sensors being provided on a respective hub arm.

12. A method as described in clause 11, wherein each strain sensor is provided on an axially forward side of the hub.

13. A method as described in clause 11 or 12, wherein each strain sensor is circumferentially aligned with a propeller blade and is axially offset from said propeller blade along a line parallel to the rotational axis of the propeller; preferably wherein each strain sensor is located radially inward of said propeller blade, and along a radial line extending from a central axis of the propeller hub along the blade.

14. A method as described in clause 11, 12 or 13, further comprising: receiving the measured strain data from the strain sensors; calculating amplitudes of the cyclic responses of the strain sensors using the measured strain data from each of the sensors; and comparing the amplitude of at least one cyclic response to the amplitude of at least one of the other cyclic responses.

15. A method as described in clause 14, further comprising establishing that the health of a blade of the propeller may be impaired if the amplitude of the cyclic response measured by the sensor provided on the hub arm from which the blade extends is above or below the remainder of the amplitudes by at least 20%, preferably more than 15%, preferably more than 10%, preferably more than 5%, and preferably more than 3%.

16. A method as described in clause 15, further comprising indicating an alert for maintenance for a blade of the propeller if it is established that the health of the blade may be impaired.

17. A method as described in any of clauses 12 to 16, wherein the strain sensors are full bridge strain gauges.

18. A method of monitoring propeller health comprising a combination of the methods of any of clauses 1 to 10 with the method of any of clauses 11 to 17.

19. A system configured to perform a method for monitoring aircraft propeller health as described in any preceding clause.

20. A propeller health monitoring system comprising: a plurality of strain sensor pairs configured to measure the strain in a hub arms of a propeller; and a processor configured to carry out the calculating, comparing and establishing steps as described in any of clauses 11 to 18.

21. An aircraft propeller comprising the propeller health monitoring system as described in clause 20, wherein: the propeller has a plurality of blades extending radially outwardly from hub arms of a propeller hub, which in turn extend radially outwardly from a central axis extending through the propeller and a propeller drive shaft; and a strain sensor is mounted on each of at least some of the hub arms.

22. An aircraft propeller as described in clause 21, wherein the processor is integrated into a FADEC of the aircraft or in the nacelle and the strain sensors are configured to transmit the measured strain to the processor via telemetry, Wi-Fi, or a slip ring.

23. An aircraft comprising an aircraft propeller as described in clause 21 or 22.

24. A method of monitoring the health of an aircraft propeller whilst the propeller is in operation, the propeller having a plurality of blades extending radially outwardly from a central axis extending through the propeller and a propeller drive shaft, the method comprising: obtaining measurements representative of strain in the propeller drive shaft using multiple primary strain sensors, each primary strain sensor providing respective measurements representative of strain; wherein the primary strain sensors are located around a circumference of the drive shaft of the propeller; wherein each primary strain sensor is located such that it crosses a plane defined by the radial direction of a blade and the central axis, the plane being bounded by the central axis; determining a respective steady bending moment of the drive shaft corresponding to each primary strain sensor using the respective measurements representative of strain obtained by each primary strain sensor; and establishing, based on the steady bending moments of the drive shaft, whether the health of the propeller may be impaired.

25. A method as described in clause 24, further comprising obtaining measurements representative of strain in the propeller drive shaft using multiple secondary strain sensors, each secondary strain sensor being located around the circumference of the drive shaft diametrically opposite to a respective primary strain sensor and forming a sensor pair therewith; and wherein the step of determining a respective steady bending moment of the drive shaft additionally comprises utilising the respective measurements representative of strain obtained by each secondary strain sensor.

26. A method as described in clause 24 or 25, further comprising indicating an alert for maintenance if it is established that the health of the propeller may be impaired.

27. A method as described in clause 24, 25 or 26, wherein the step of establishing whether the health of the propeller may be impaired comprises comparing the magnitude of the calculated steady bending moments to a threshold.

28 A method as described in clause 27, further comprising: establishing that the health of the propeller may be impaired if the magnitude of a calculated steady bending moment of the drive shaft is above a threshold.

29. A method as described in clause 24, 25 or 26, wherein the step of establishing whether the health of the propeller may be impaired comprises comparing the magnitude of the calculated steady bending moments to one another.

30. A method as described in clause 29, further comprising establishing that the health of the propeller may be impaired if the magnitude of one of the steady bending moments of the drive shaft is outside of a tolerance of the other steady bending moments of the drive shaft.

31. A method as described in clause 28 or 30, further comprising: for a propeller having an odd number of blades, identifying a damaged blade by: identifying the blade corresponding to the primary sensor or sensor pair which provided the measurement(s) representative of strain which has led to a steady bending moment being calculated which has a magnitude above the threshold and/or which is outside of the tolerance of the other steady bending moments of the drive shaft; and preferably indicating an alert for maintenance of the identified blade.

32. A method as described in clause 28 or 30, further comprising: for a propeller having an even number of blades, identifying which two diametrically opposed blades may include at least one damaged blade, by: identifying the blades corresponding to the primary sensor or sensor pair which has provided the measurement(s) representative of strain which has led to a steady bending moment being calculated which has a magnitude above the threshold and/or which is outside of the tolerance of the other steady bending moments of the drive shaft; and preferably indicating an alert for maintenance of the identified blades.

33. A method as described in any of clauses 24 to 32, wherein the strain sensors are full bridge strain gauges.

34. A system configured to perform a method for monitoring aircraft propeller health as described in any of clauses 24 to 32.

35. A propeller health monitoring system comprising: a plurality of primary strain sensors or pairs of primary and secondary strain sensors, the primary strain sensors or strain sensor pairs being configured to provide measurements representative of strain in a drive shaft of a propeller; and a processor configured to carry out the determining, comparing and establishing steps as described in any of clauses 24 to 33.

36. An aircraft propeller comprising the propeller health monitoring system as described in clause 35, wherein: the propeller has a plurality of blades extending radially outwardly from hub arms of a propeller hub, which in turn extend radially outwardly from a central axis extending through the propeller and a propeller drive shaft; the primary strain sensors or pairs of primary and secondary strain sensors are arranged around a circumference of the drive shaft of the propeller; each primary strain sensor is located such that it crosses a plane defined by the radial direction of a blade and the central axis, the plane being bounded by the central axis; and in the case in which strain sensor pairs are provided, each secondary strain sensor in the strain sensor pair is located around the circumference of the drive shaft diametrically opposite to its corresponding primary strain sensor.

37. An aircraft propeller as described in clause 36, wherein the processor is integrated into a FADEC of the aircraft or in the nacelle and the strain sensors are configured to transmit the measured strain to the processor via telemetry, Wi-Fi, or a slip ring.

38. An aircraft comprising an aircraft propeller as described in clauses 36 or 37.

In the above described clauses 24 to 38, the step of determining a respective steady bending moment of the drive shaft may comprise converting each measurement representative of strain into a bending moment value. This may be done by calculating the bending moment from the measurements representative of strain. A calibration may be made between measurements representative of strain and bending moment in order to find a constant value to convert strain to bending moment, without the need for a full bending moment calculation.

The step of determining a respective steady bending moment of the drive shaft may include utilising a first algorithm to calculate the time taken for one revolution of the propeller, given by $(RPM/60)^{-1}$. Then, a second algorithm may be utilised to record the maximum and minimum bending moment determined utilising the measurements representative of strain from each primary sensor (or sensor pair) in each revolution. A third algorithm may be used to calculate the steady bending moment (SBM) corresponding to each strain sensor in each revolution by taking the average of the recorded maximum and minimum bending moments, i.e. (max+min)/2.

The inventon claimed is:

1. A method of monitoring the health of an aircraft propeller whilst the propeller is in operation, the propeller having a plurality of blades extending radially outwardly from a central axis extending through the propeller and a propeller drive shaft, the method comprising:
    disposing multiple primary strain sensors around a circumference of the drive shaft of the propeller; and
    obtaining measurements representative of strain in the propeller drive shaft using multiple primary strain sensors, each primary strain sensor providing a respective measurement representative of strain;
    wherein each primary strain sensor is located such that it crosses a plane defined by the radial direction of a blade and the central axis, the plane being bounded by the central axis.

2. The method as claimed in claim 1, further comprising:
    obtaining measurements representative of strain in the propeller drive shaft using multiple secondary strain sensors, each secondary strain sensor being located around the circumference of the drive shaft diametrically opposite to a respective primary strain sensor and forming a sensor pair therewith.

3. The method as claimed in claim 1, further comprising:
    determining a respective steady bending moment of the drive shaft using the respective measurements representative of strain obtained by each primary strain sensor.

4. The method as claimed in claim 3, further comprising:
    comparing the magnitude of the calculated steady bending moments to a threshold.

5. The method as claimed in claim 4, further comprising:
    establishing that the health of the propeller may be impaired if the magnitude of a calculated steady bending moment of the drive shaft is above a threshold.

6. The method as claimed in claim 3, further comprising:
comparing the magnitude of the calculated steady bending moments to one another.

7. The method as claimed in claim 6, further comprising:
establishing that the health of the propeller may be impaired if the magnitude of one of the steady bending moments of the drive shaft is outside of a tolerance of the other steady bending moments of the drive shaft.

8. The method as claimed in claim 5, further comprising:
for a propeller having an odd number of blades, identifying a damaged blade by:
identifying the blade corresponding to the primary sensor which provided the measurements representative of strain which has led to a steady bending moment being calculated which has a magnitude above the threshold; or
for a propeller having an even number of blades, identifying which two diametrically opposed blades may include at least one damaged blade, by:
identifying the blades corresponding to the primary sensor which has provided the measurements representative of strain which has led to a steady bending moment being calculated which has a magnitude above the threshold.

9. The method as claimed in claim 7, further comprising:
for a propeller having an even number of blades, identifying which two diametrically opposed blades may include at least one damaged blade, by:
identifying the blades corresponding to the primary sensor which has provided the measurements representative of strain which has led to a steady bending moment being calculated which is outside of the tolerance of the other steady bending moments of the drive shaft; or
for a propeller having an odd number of blades, identifying a damaged blade by:
identifying the blade corresponding to the primary sensor which provided the measurements representative of strain which has led to a steady bending moment being calculated which is outside of the tolerance of the other steady bending moments of the drive shaft.

10. The method as claimed in claim 1, wherein the strain sensors are full bridge strain gauges.

11. An aircraft propeller system comprising:
a propeller and a propeller health monitoring system configured to monitor the health of the propeller while the propeller is in operation, the propeller health monitoring system comprising:
a plurality of primary strain sensors or pairs of primary and secondary strain sensors, the primary strain sensors or strain sensor pairs being configured to provide measurements representative of strain in a drive shaft of a propeller; and
a processor, wherein
the propeller has a plurality of blades extending radially outwardly from hub arms of a propeller hub, which in turn extend radially outwardly from a central axis extending through the propeller and a propeller drive shaft;
the primary strain sensors or pairs of primary and secondary strain sensors are arranged around a circumference of the drive shaft of the propeller;
each primary strain sensor is located such that it crosses a plane defined by the radial direction of a blade and the central axis, the plane being bounded by the central axis; and
in the case in which strain sensor pairs are provided, each secondary strain sensor in the strain sensor pair is located around the circumference of the drive shaft diametrically opposite to its corresponding primary strain sensor.

12. The aircraft propeller system as claimed in claim 11, wherein the processor is integrated into a FADEC of an aircraft or in a nacelle and the strain sensors are configured to transmit the measured strain to the processor via telemetry, Wi-Fi, or a slip ring.

13. A propeller aircraft comprising the aircraft propeller system as claimed in claim 11.

14. The aircraft propeller system as claimed in claim 11, wherein the processor is configured to:
determine a respective steady bending moment of the drive shaft using the respective measurements representative of strain obtained by each primary strain sensor or using the respective measurements representative of strain obtained by each strain sensor pair;
and either compare the magnitude of the calculated steady bending moments to a threshold and establish that the health of the propeller may be impaired if the magnitude of a calculated steady bending moment of the drive shaft is above a threshold; or
compare the magnitude of the calculated steady bending moments to one another and establish that the health of the propeller may be impaired if the magnitude of one of the steady bending moments of the drive shaft is outside of a tolerance of the other steady bending moments of the drive shaft.

15. The method as claimed in claim 2, further comprising:
determining a respective steady bending moment of the drive shaft using the respective measurements representative of strain obtained by each strain sensor pair.

16. The method as claimed in claim 15, further comprising:
comparing the magnitude of the calculated steady bending moments to a threshold.

17. The method as claimed in claim 16, further comprising:
establishing that the health of the propeller may be impaired if the magnitude of a calculated steady bending moment of the drive shaft is above a threshold.

18. The method as claimed in claim 17, further comprising:
for a propeller having an odd number of blades, identifying a damaged blade by:
identifying the blade corresponding to the sensor pair which provided the measurements representative of strain which has led to a steady bending moment being calculated which has a magnitude above the threshold; or
for a propeller having an even number of blades, identifying which two diametrically opposed blades may include at least one damaged blade, by:
identifying the blades corresponding to the sensor pair which has provided the measurements representative of strain which has led to a steady bending moment being calculated which has a magnitude above the threshold.

19. The method as claimed in claim 15, further comprising:
comparing the magnitude of the calculated steady bending moments to one another.

20. The method as claimed in claim 19, further comprising:
establishing that the health of the propeller may be impaired if the magnitude of one of the steady bending moments of the drive shaft is outside of a tolerance of the other steady bending moments of the drive shaft.

\* \* \* \* \*